United States Patent
Braginsky et al.

(10) Patent No.: US 12,512,760 B2
(45) Date of Patent: Dec. 30, 2025

(54) ZERO VOLTAGE SWITCHING

(71) Applicant: Solaredge Technologies Ltd., Herzeliya (IL)

(72) Inventors: David Braginsky, Yokne'am (IL); Eado Twig, Zur Itshak (IL)

(73) Assignee: Solaredge Technologies Ltd., Herzeliya (IL)

( * ) Notice: Subject to any disclaimer, the term of this patent is extended or adjusted under 35 U.S.C. 154(b) by 255 days.

(21) Appl. No.: 18/310,651

(22) Filed: May 2, 2023

(65) Prior Publication Data

US 2023/0361669 A1 Nov. 9, 2023

Related U.S. Application Data

(60) Provisional application No. 63/338,484, filed on May 5, 2022.

(51) Int. Cl.
*H02M 3/158* (2006.01)
*H02M 1/00* (2006.01)

(52) U.S. Cl.
CPC ....... *H02M 3/1584* (2013.01); *H02M 1/0058* (2021.05); *H02M 1/0064* (2021.05)

(58) Field of Classification Search
CPC . H02M 3/1584; H02M 3/1586; H02M 1/0064
See application file for complete search history.

(56) References Cited

U.S. PATENT DOCUMENTS

| | | | |
|---|---|---|---|
| 6,147,886 A | 11/2000 | Wittenbreder | |
| 6,246,599 B1 | 6/2001 | Jang et al. | |
| 6,272,023 B1 | 8/2001 | Wittenbreder | |
| 9,705,422 B2 | 7/2017 | Liu et al. | |
| 9,935,562 B2 | 4/2018 | Eren et al. | |
| 10,217,559 B2 | 2/2019 | Yang et al. | |
| 10,498,237 B1 | 12/2019 | Lin et al. | |
| 2005/0275458 A1 | 12/2005 | Mukherjee et al. | |
| 2014/0268932 A1 | 9/2014 | Gupta et al. | |

(Continued)

FOREIGN PATENT DOCUMENTS

| | | | | |
|---|---|---|---|---|
| EP | 3876404 A1 | 9/2021 | | |
| WO | WO-2023148134 A1 * | 8/2023 | .......... | H02M 1/0058 |

OTHER PUBLICATIONS

Machine translation of WO 2023148134-A1. (Year: 2023).*

(Continued)

*Primary Examiner* — Peter M Novak
(74) *Attorney, Agent, or Firm* — Banner & Witcoff, Ltd.

(57) ABSTRACT

A switching circuit may comprise first and second switch legs and a coupled inductor. The controller may operate the first and second switch legs to control a current flowing through the coupled inductor such that zero voltage switching (ZVS) may be applied to the first and second switch legs. The system may determine a switching event time of a switch in the first switch leg, and determine a switching node voltage rise event time of the first switch leg based on a voltage measured at a switching node of the first switch leg. The controller may drive one or more switches using PWM signals. For example, the controller may drive one or more switches based on determining, for a switching instance, a phase difference between a first PWM signal and a second PWM signal for generating a ripple current for ZVS.

18 Claims, 15 Drawing Sheets

(56) References Cited

U.S. PATENT DOCUMENTS

| | | | |
|---|---|---|---|
| 2015/0061625 A1 | 3/2015 | Chen et al. | |
| 2021/0226536 A1 | 7/2021 | Couleur et al. | |
| 2022/0021307 A1* | 1/2022 | Cao | H02M 3/1584 |
| 2022/0231602 A1* | 7/2022 | Martinelli | H02M 1/088 |

OTHER PUBLICATIONS

Lee et al., "Analysis and Design of Coupled Inductors for Two-Phase Interleaved DC-DC Converters, Journal of Power Electronics," vol. 13, No. 3, May 2013.

Alavi et al., "New auxiliary circuit for boost converter to achieve soft-switching operation and zero input current ripple, IET Power Electronics," vol. 13, Iss. 17, 2020.

Kumar, A., "High-Performance Power Converters for Telecom and Datacenter Applications," University of Colorado, 2018.

Marxgut et al., "Interleaved Triangular Current Mode (TCM) Resonant Transition, Single Phase PFC Rectifier with High Efficiency and High Power Density," The 2010 International Power Electronics Conference.

Suma, S., "A Full Bridge Inverter with Soft Switching Technique Using SPWM Scheme," International Journal of Science and Research, vol. 6 Iss. 9, Sep. 2017.

Y. Yau et al., "Simple Structure of Soft Switching for Boost Converter," Energies, 13, 5448, Oct. 2020.

A. Dobi et al., "Overview of Soft-switching DC-DC Converters," International Journal of Power Electronics and Drive System, vol. 9, No. 4, pp. 2006-2018, Dec. 2018.

Sep. 27, 2023—European Search Report EP No. 23171505.3.

Asa Erdem et al., "Constant Frequency ZVS PWM Coverter", 2021 IEEE Transportation Electrification Conference & Expo (ITEC), IEEE, Jun. 21, 2021, pp. 1-6.

Kim Dongkwun, et al., "An Integrated Programmable Gate Timing Control and Gate Driver Chip for A 48V-to-0.75V Active-Clamp Forward Converter Power Block",2020 IEEE Energy Conversion Congress and Exposition (ECCE), IEEE, Oct. 11, 2020, pp. 130-134.

Pajnic Milan, et al., "Design consideration for high frequency LLC resonant converter with matrix transformer", 2017 International Symposium on Power Electronics (EE), IEEE, Oct. 19, 2017, pp. 1-6.

Zhao A., et al., "One-step digital dead-time correction for DC-DC converters", Applied Power Electronics Conference and Exposition (APEC), 2010 Twenty-Fifth Annual IEEE, IEEE, Piscataway, NJ, USA, Feb. 21, 2010, pp. 132-137.

Dong Minghai, et al., "A Postprocessing Technique Based Switching Loss Estimation Method for GaN Devices", IEEE Transactions on Power Electronics, Institute of Electrical and Electronics Engineers, USA, vol. 36, No. 7, Dec. 10, 2020.

Jun. 26, 2025—European Examination Report—EP App. No. 23171505.3.

* cited by examiner

ZERO VOLTAGE SWITCHING

CROSS-REFERENCE TO RELATED APPLICATIONS

The present application claims priority to U.S. Provisional Application 63/338,484 filed May 5, 2022. The entire disclosure of the foregoing application is incorporated by reference in its entirety.

FIELD

Aspects disclosed herein relate generally to power systems. More specifically, the disclosure may provide a device, system or method for zero voltage switching in a switching circuit (e.g., a power inverter), wherein the switching circuit may include a coupled inductor.

BACKGROUND

Power circuits may employ Zero Voltage Switching (ZVS) to reduce losses associated with the transition of switches between states (e.g., between an off-state and an on-state or vice versa). Such losses are also referred to as switching losses. Power may dissipate in a switch in presence of a voltage across the switch and current flowing through the switch. Employing ZVS may reduce power dissipation during a transition between states, such as by transitioning between states when there is no voltage across the switch.

BRIEF SUMMARY

The following presents a simplified summary of the disclosure herein in order to provide a basic understanding of some aspects of the disclosure. This summary is not an extensive overview of the disclosure. It is not intended to identify key or critical elements of the disclosure or to delineate the scope of the invention. The following summary merely presents some concepts of the disclosure in a simplified form as a prelude to the more detailed description provided below.

An aspect of the disclosure provides a switching circuit, which may comprise a first switch leg, a second switch leg, a controller, and a coupled inductor. The controller may be configured to operate the first and second switch legs to control currents flowing through the coupled inductor such that ZVS may be applied to the first or second switch legs.

An aspect of the disclosure may provide a method for ZVS. The method may include recognizing a switching event time (e.g., where a pulse width modulation (PWM) signal controls a switch to transition from an off-state to an on-state) of a switch in a first leg, and determining a switching node voltage rise event time of at least the first switch leg based on a measurement of a voltage at a switching node of the first switch leg. The switching node voltage rise event time may correspond to a time at which a voltage measured at the switching node reaches a threshold voltage. The method may further include determining a time difference between the switching event time of the switch in the first switch leg and the switching node voltage rise event time. The method may also include determining a phase difference between a first PWM signal and a second PWM signal based on the time difference between the switching event time of the switch in the first switch leg and the switching node voltage rise event time. The method may further include generating, based on the determined phase difference, the first PWM signal for the first switch leg and the second PWM signal for the second switch leg.

BRIEF DESCRIPTION OF THE DRAWINGS

A more complete understanding of the aspects disclosed herein and the potential advantages thereof may be acquired by referring to the following description in consideration of the accompanying drawings, in which like reference numbers indicate like features, and wherein.

DETAILED DESCRIPTION

Figure 1:
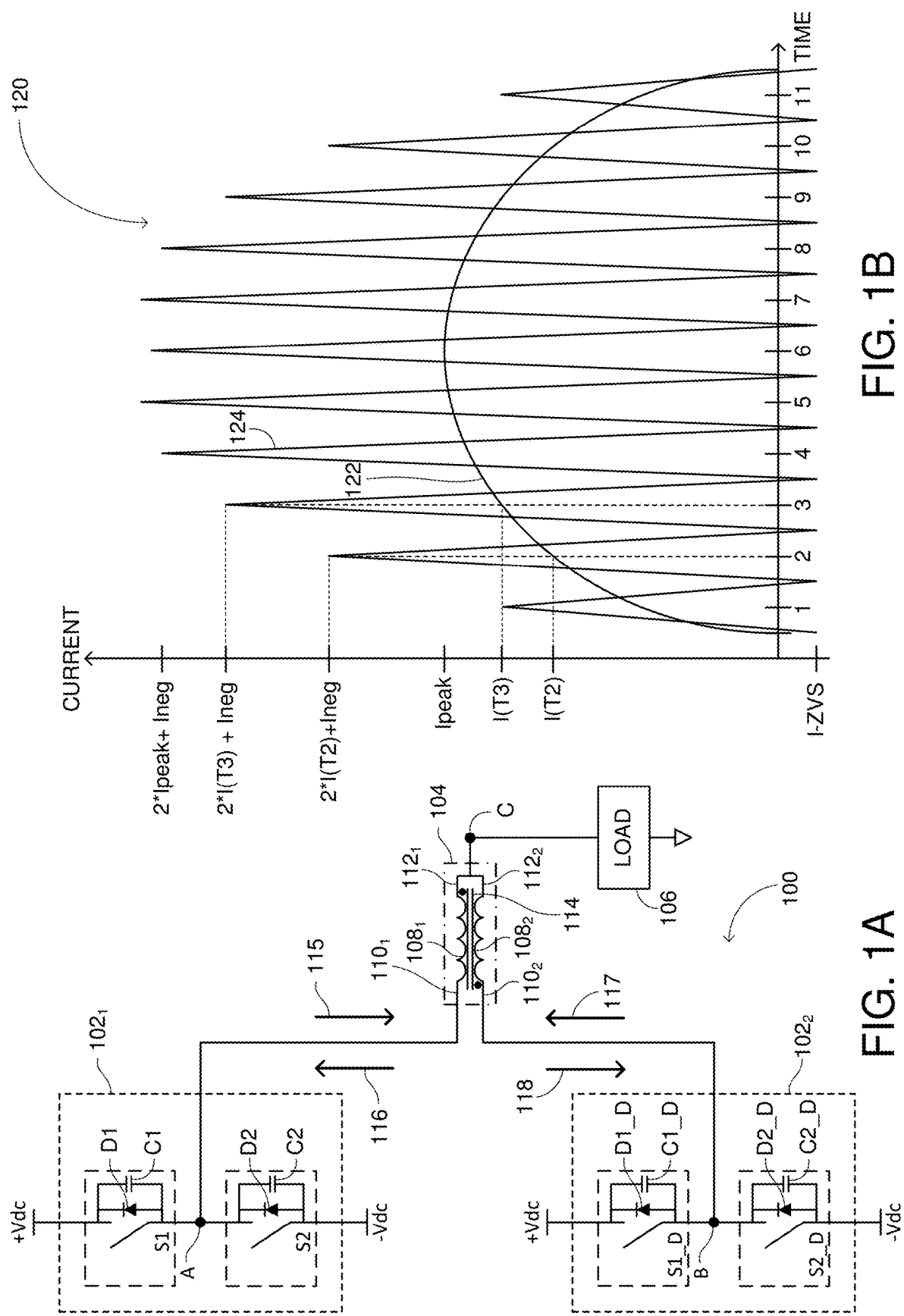
FIG. 1A shows an example of a power circuit according to an aspect of the disclosure herein.
FIG. 1B shows an example ripple current curve according to an aspect of the disclosure herein.

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope of the present disclosure. The term "node" herein relates to a point between components and/or modules, for example a point at which two or more components and/or modules may be connected.

A switching circuit, which may be part of a power converter (e.g., a half-bridge converter comprising two switches coupled in series), may employ an inductor (e.g., coupled at the switching (intermediate) node of the series coupled switches). Such a circuit may include one or more controllers configured to provide a PWM signal or signals for controlling the switches in the circuit. In such circuits, the inductor ripple current, $\Delta L$, may be inversely proportional to the inductance of the inductor, and inversely proportional to the switching frequency. For example, in case the power converter is a buck converter circuit, the inductor ripple current, $\Delta L$, may be as follows:

$$\Delta I_L = \frac{V_{in} \cdot D \cdot (1-D) \cdot T_s}{L} \quad (1)$$

$$\frac{\Delta I_L}{T_s} = \frac{V_{in} \cdot D \cdot (1-D)}{L} \quad (2)$$

where Vin is an input voltage, D is a duty cycle of the PWM signal or signals, Ts is a switching period, and L is an inductance of the inductor. According to Equation (2), the rate of change of the current through inductor may be changed by changing any of the inductance L of the inductor, the switching frequency 1/Ts, or the duty cycle D.

Furthermore, such as to enable Zero Voltage Switching (ZVS) of a switch from an off-state (which may be non-conducting) to an on-state (which may be conducting), the inductor ripple current may be negative (e.g., flowing from the inductor to the switching node). The level of negative inductor ripple current, or the duration of the negative inductor ripple current, or both, may be sufficient to discharge the energy stored in a capacitor (e.g., a parasitic capacitor) of the switch and reduce the voltage across the switch to zero. For the inductor ripple current to result in a desired output current, and enable ZVS, the maximum level of the inductor ripple current may be at least twice the desired output current plus the negative current (e.g., a current flowing from the inductor to the switching node).

According to the aspects of the disclosure herein, a switch in a switching circuit, which may be a part of a power circuit (e.g., a power converter such as an inverter), may be switched under ZVS conditions (when the voltage across the switch is zero). The power circuit may comprise two switch legs, each with serially connected switches, and a coupled inductor disposed between the switch legs. According to the disclosure herein, a magnitude of the negative current (e.g., discharging the corresponding a capacitor of a switch in one of the switch legs) may be controlled by controlling the equivalent inductance of the corresponding winding of the coupled inductor. The equivalent inductance of the corresponding winding of the coupled inductor may be controlled by controlling a phase difference between the currents flowing through the windings of the coupled inductor. A phase difference between the currents flowing through the windings of the coupled inductor may be controlled by controlling the phase difference between the corresponding PWM signals driving the switch legs. The control of the phase difference between the corresponding PWM signals driving the switch legs may employ a closed control loop, based on measurement of a switching node, as further explained below.

A coupled inductor may be employed to control the ripple current through the windings. For example, the ripple current through the windings may be controlled such that the negative ripple current in one or both of the windings may be sufficient for ZVS, and the peak ripple current may be 2ITi, where ITi is the current of through the winding at a time instance Ti (e.g., the level of the ripple current in one or both the windings may be not smaller than a current sufficient for ZVS). Thus, losses (e.g., conduction losses) may be reduced. As further explained below, the equivalent inductance of a winding in a coupled inductor may relate to a phase difference between the currents flowing through the windings of the coupled inductor. Thus, the current through the winding may be controlled by controlling a phase difference between the currents flowing through each of the windings of the coupled inductor, as may be further explained below. It is noted that the term 'zero' in the disclosure herein may relate to the value zero or substantially zero (e.g., within a determined tolerance). Similarly, the term 'equals' or the sign '=' relate to substantially equals (e.g., within a determined tolerance).

Reference is now made to FIGS. 1A and 1B, which show an example of a power circuit 100, and a corresponding example diagram 120 of current through the power circuit 100 versus time. For example, power circuit 100 may be a half-bridge DC-AC (direct current to alternating current) inverter or a synchronized DC-DC (direct current to direct current) buck converter. Referring to FIG. 1A, power circuit 100 may comprise a first switch leg $102_1$, a second switch leg $102_2$, and a coupled inductor 104. First switch leg $102_1$ may comprise two switches, S1 and S2. Second switch leg $102_2$ may comprise two switches, S1_D and S2_D. Switch S1, switch S2, switch S2_D, or switch S2_D may each comprise a diode (e.g., parasitic diode and/or additional diode) and a capacitor. Switch S1 may comprise diode D1 and capacitor C1. Switch S2 may comprise diode D2 and capacitor C2. Switch S1_D may comprise diode D1_D and capacitor C1_D. Switch S2_D may comprise diode D2_D and capacitor C2_D. The diodes D1, D2, D1_D, or D2_D may be corresponding body diodes of switch S1, switch S2, switch S1_D, or switch S2_D. The capacitors C1, C2, C1_D, or C2_D may be a corresponding parasitic capacitor of switch S1, switch S2, switch S1_D, or switch S2_D. Switch S1, switch S2, switch S2_D, or switch S2_D may each be configured to transition between an off-state and an on-state. Switches S1 and S2 may be coupled in series at a switching node 'A'. The serially coupled switches S1 and S2 may be coupled across a supply voltage ±Vdc (e.g., ±50V, ±100V, ±200V, ±350V, ±400V, ±600V, ±800V, ±1000V). The supply voltage may be provided by a power source (e.g., a photovoltaic panel or panels, a wind turbine, a supercapacitor, a fuel cell) where the switch legs are configured to be coupled to the power source. Switches S1_D and S2_D may be coupled in series at a switching node 'B'. The serially coupled switches S1_D and S2_D may be coupled across a supply voltage ±Vdc (e.g., ±50V, ±100V, ±200V, ±350V, ±400V, ±600V, ±800V, ±1000V). The supply voltage may be referenced to a ground potential.

Coupled inductor 104 may comprise a first winding $108_1$ (which may comprise a first end $110_1$ and a second end $112_1$). Coupled inductor 104 may further comprise a second winding $108_2$ (which may comprise a first end $110_2$, and a second end $112_2$). First winding $108_1$ and second winding $108_2$ may be wound around a common core 114. The first end $110_1$ of first winding $108_1$ may be coupled with switching node 'A'. The first end $110_2$ of second winding $108_2$ may be coupled with node B. Second end $112_1$ of first winding $108_1$ may be coupled to the second end $112_2$ of the second winding $108_2$ at a node 'C'. Node 'C' may be coupled to a load 106. Power circuit 100 may be configured to convert power (e.g., direct current (DC) to alternating current (AC), or DC to DC) by (e.g., a controller controlling switch legs $102_1$ and $102_2$) transitioning switches S1, S2, S1_D, and S2_D between an off-state and an on-state (e.g., according to a PWM signal or signals). Switches S1, S2, S1_D, and S2_D may be implemented as Metal Oxide Semiconductor Field Effect Transistors (MOSFET), Galium Nitride (GaN) based transistors, Insulated-Gate Bipolar Transistors (IGBTs), Bipolar Junction Transistors (BJT), and/or any other types of transistors. In FIG. 1A, a positive direction of current flow (positive current) may be defined as current flowing from switching node 'A' toward load 106 though coupled inductor 104, as indicated by arrow 115, or current flowing from switching node 'B' toward load 106 through coupled inductor 104, as indicated by arrow 117. A negative direction of current flow (negative current) may be defined as current flowing from load 106 through coupled inductor 104 toward switching node 'A', as indicated by arrow 116, or current flowing from load 106 toward switching node 'B' through coupled inductor 104, as indicated by arrow 118.

FIG. 1B depicts a diagram of a half cycle of an output current 122 of power circuit 100 (e.g., the current through load 106), and a ripple current 124 of the current through one of first winding 108₁ or second winding 108₂ of coupled inductor 104. In FIG. 1B, the equivalent inductance of one or both of first winding 108₁ or second winding 108₂ in coupled inductor 104 may be controlled such that the level of the corresponding ripple current 124 at a time instant is suitable for ZVS of a switch in the first switch leg 102 or second switch leg 102₂. For example, the ripple current 124 may be controlled such that the level of ripple current 124 at a time instant may not be lower than I-ZVS (which may be the level of negative ripple current sufficient for ZVS), and the peak ripple current may be at least 2·ITi+Ineg, where ITi may be the output current from power circuit 100 at a time instance Ti and Ineg may be the negative current through the one of first winding 102₁ or second winding 102₂. It is noted that, since the minimum current may be I-ZVS for all time instances in FIG. 1B, but the peak ripple current may be different for the different time instances, the rate of change of the current may also change.

The equivalent inductance of a winding in a coupled inductor may be based on a phase difference between the current through first winding 108₁ and the current through second winding 108₂. Thus, the equivalent inductance of a winding in coupled inductor 104 may be controlled by controlling the phase difference between the current through first winding 108₁ and the current through second winding 108₂. For example, the voltage across winding 108₁ may be as follows:

$$V_{L1} = L_1 \frac{di_1}{dt} + M \frac{di_2}{dt} \quad (3)$$

where $V_{L1}$ is the voltage across coupled windings 108₁, $L_1$ is the inductance of windings 108₁, M is the mutual inductance coefficient between winding 108₁ and winding 108₂, $i_1$ is the current through winding 108₁, $i_2$ is the current through winding 108₂, and d/dt is the derivative operator. For $i_1$ and $i_2$ being of the same magnitude I and frequency ω, but with a phase difference $\Delta\theta_{I-12}$, $i_1$ and $i_2$ may be expressed as follows:

$$i_1 = I e^{jwt} \quad (4)$$

$$i_2 = I e^{j(wt+\Delta\theta_{I-12})} \quad (5)$$

The Derivatives of $i_1$ and $i_2$ May be Expressed as Follows:

$$\frac{di_1}{dt} = j\omega I e^{j\omega t} \quad (6)$$

$$\frac{di_2}{dt} = j\omega I e^{j(\omega t+\Delta\theta_{I-12})} \quad (7)$$

Substituting Equations (6) and (7) into Equation (3) May Result in the Following:

$$V_{L1} = jwL_1 I e^{jwt} + jwML_1 I e^{j(wt+\Delta\theta_{I-12})} \quad (8)$$

$$V_{L1} = jwL_1 I e^{jwt} + jwML_1 I e^{jwt} e^{j\Delta\theta_{I-12}} \quad (9)$$

$$V_{L1} = (L_1 + M e^{j\Delta\theta_{I-12}}) jwI e^{jwt} \quad (10)$$

In Equation (10), $(L_1+M e^{j\Delta\theta})$ May be a Phase-Dependent Equivalent Inductance of Winding 108₁ as Follows:

$$L_1(\Delta\theta) = (L_1 + M e^{j\Delta\theta_{I-12}}) \quad (11)$$

$$V_{L1} = L(\Delta\theta_{I-12}) \frac{di_1}{dt} \quad (12)$$

$$\frac{di_1}{dt} = \frac{1}{L(\Delta\theta_{I-12})} V_{L1} \quad (13)$$

$$i_1 = \frac{1}{L(\Delta\theta_{I-12})} \int V_{L1} dt \quad (14)$$

From equation (11), the value of the equivalent inductance of first winding 108₁ in coupled inductor 104 may be a function of a phase difference, $\Delta\theta_{I-12}$, between the currents flowing through first windings 108₁ and second windings 108₂. From equation (13), the rate of change of the current through first winding 108₁ of coupled inductor 104 may depend on the equivalent inductance of first winding 108₁. A similar derivation to equations (3)-(14) may be applied to the current through second winding 108₂. Thus, the ripple current in first winding 108₁ or second winding 108₂ of coupled inductor 104 may be controlled by controlling the phase difference $\Delta\theta_{I-12}$ between the currents through windings 108₁ and 108₂. The phase difference $\Delta\theta_{I-12}$ between the current through winding 108₁ and the current through winding 108₂ may be controlled by generating two PWM signals, a first PWM signal for controlling first switch leg 102₁, and a second PWM signal for controlling second switch leg 102₂, with the phase difference $\Delta\theta_{PWM}$ between the two PWM signals (e.g., where $\Delta\theta_{I-12}$ may be equal to $\Delta\theta_{PWM}$). Such as in the case that the power circuit is a buck converter, Equation (11) may be substituted into Equation (1) above to show that the ripple current, $\Delta I_L$, is inversely proportional to the phase dependent equivalent inductance, and the switching frequency.

The phase difference between the first PWM signal of switch leg 102₁ and the second PWM signal of switch leg 102₂ may be determined based on a measurement of a voltage at switching node 'A', at switching node B', or at both switching node 'A' and switching node 13'. The measurement of the voltage at switching node 'A' and/or at switching node B' may be relative to a reference voltage (e.g., relative to a ground potential, relative to +Vdc, or relative to—Vdc). The example herein relates to measuring the voltage at switching node 'A'. The voltage at switching node 'A' in which switch S1 may switch at ZVS may relate to (e.g. correspond directly to, or be dependent on) a time at which the voltage across switch S1 may be substantially zero, and capacitor C1 is discharged. Based on the voltage measured at switching node 'A' (herein $V_A$), an event time of a voltage rise in switching node 'A' (referred to herein as a 'switching node voltage rise event time') may be determined. For example, the switching node voltage rise event time may be detected based on $V_A$ reaching a threshold voltage $V_{th}$. A switching event time of S1 may also be detected. For example, a switching event time of S1 may be a time in which the first PWM signal controls switch S1 to transition from an off-state to an on-state. A time difference, between the switching event time of S1 and the time of the switching node voltage rise event, may be determined (e.g., by a controller coupled to node 'A' and/or node B', such as controller 202 discussed below). This time difference may relate to (e.g., be derivable from) the difference between the actual ripple current through first winding 108₁ at the switching time of S1, and I-ZVS (e.g., the negative ripple current desired to discharge C1) as further explained below (e.g., in conjunction with FIGS. 3A-3B, and 4A-4E). Based on this time difference, the equivalent inductance of first winding $108_1$ may be controlled such that the negative value of the ripple current through first winding $108_1$ at the switching time of S1 may not be lower than I-ZVS. Based on the determined time difference, a phase difference $\Delta\theta_{pwm}$ between the first PWM signal and the second PWM signal may be determined (e.g., calculated or derived from a look-up table). For example, the phase difference $\Delta\theta_{pwm}$ may be determined (e.g., by a controller using a computational model) based on the equations above (e.g., Equations (1), (2), (11), (12), (13), and/or (14)), Vdc, and/or the capacitance of capacitor C1. The relationship between the time difference between the switching event time of switch S1 and the switching node voltage rise event time, and the phase difference $\Delta\theta_{pwm}$ between the first PWM signal and the second PWM signal, may be implemented in a Look Up Table (LUT). For example, the LUT may be determined based on Equations (1), (2), (11)-(14) above, Vdc, and/or the capacitance of capacitor C1. The LUT may be determined experimentally. Controlling the equivalent inductance of one of first winding $108_1$ of second winding $108_2$ of coupled inductor 104 may result in a ripple current sufficient for ZVS and may reduce the power dissipation of power circuit 100 (e.g., relative to a power circuit which does not employ a coupled inductor with current phase control as disclosed herein).

In some power circuits, such as power circuit 100, it may be sufficient to measure the voltage (e.g., relative to a reference voltage) at a single switch node (e.g., switching node 'A' or switching node B') to determine a phase difference between the PWM signals controlling the switch legs. For example, where switch leg $102_1$ and switch leg $102_2$ feature similar components (e.g., switches having similar characteristics such as rise-time or fall-time, reverse recovery, capacitance, etc.), and winding $108_1$ is similar to winding $108_2$ (e.g., a similar wire and a similar number of turns), it may be sufficient to measure the voltage at switching node 'A' only to determine the phase difference resulting in I-ZVS for switch S1_D in switch leg $102_2$ as well, since the same level of negative current may flow through second winding $108_2$, at the respective phase difference, and may discharge capacitor C2. As mentioned above, a voltage may be measured at both switching node 'A' and switching node B'.

Figure 2:
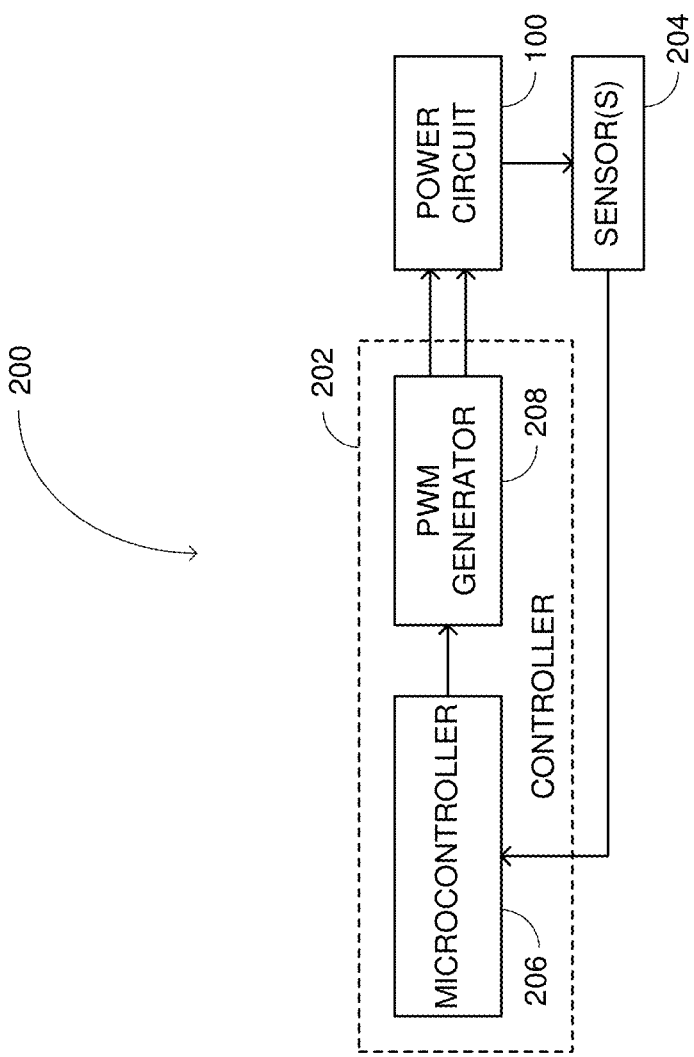
FIG. 2 shows an example of a system according to an aspect of the disclosure herein.

Reference is now made to FIG. 2, which shows an example of a circuit arrangement 200 according to aspects of the disclosure herein. Circuit arrangement 200 may comprise power circuit 100 (which may be shown in FIG. 1A), a controller 202 and sensor(s) 204. Controller 202 may comprise a microcontroller 206 and a PWM generator 208.

Microcontroller 206 may be coupled with PWM generator 208. PWM generator 208 may be coupled with first switch leg $102_1$ and with second switch leg $102_2$. Sensor(s) 204 may be coupled with power circuit 100 and microcontroller 206. Sensor(s) 204 may be configured to measure a voltage, for example, at switching node 'A' of first switch leg $102_1$, at switching node B' of second switch leg $102_2$, or both, and may provide the measurement to microcontroller 206. Such as when sensor(s) 204 measure voltage, sensor(s) 204 may be based on a resistive or capacitive divider, a resistive or capacitive bridge, comparators (e.g., employing operational amplifiers), or the like. Such as when sensor(s) 204 measure current, sensor(s) 204 may comprise a Current Transformer ("CT") sensor, Hall effect sensor, zero flux sensor, or the like. Microcontroller 206 may be configured to determine (e.g., calculate, or look up using the LUT discussed previously) a phase difference between a PWM signal for first switch leg $102_1$ and a PWM signal for second switch leg $102_2$, and may provide the determined phase difference to PWM generator 208. PWM generator 208 may be configured to generate a first PWM signal for first switch leg $102_1$, and a second PWM signal for second switch leg $102_2$, based on the determined phase difference. Switches S1 and S2 of first switch leg $102_1$ may switch between the off-state and the on-state based on the first PWM signal. Switches S1_D and S2_D of second switch leg $102_1$ may switch between the off-state and the on-state based on the second PWM signal. Controller 202 may be implemented with discrete components, as an Application Specific Integrated Circuit (ASIC) processor, as a Field Programmable Gate Array (FPGA) processor, by a Digital Signal Processor (DSP), by a general purpose computer or a combination thereof. Controller 202 may be a distributed device including several controllers communicating via a network. Circuit arrangement 200 may employ a closed loop control of the phase difference between first PWM signal and the second PWM signal, using measurements from sensor(s) 204 (e.g., a voltage sensor or sensors measuring voltage on switching node 'A', or switching node B', or both) as feedback.

Figure 3A:
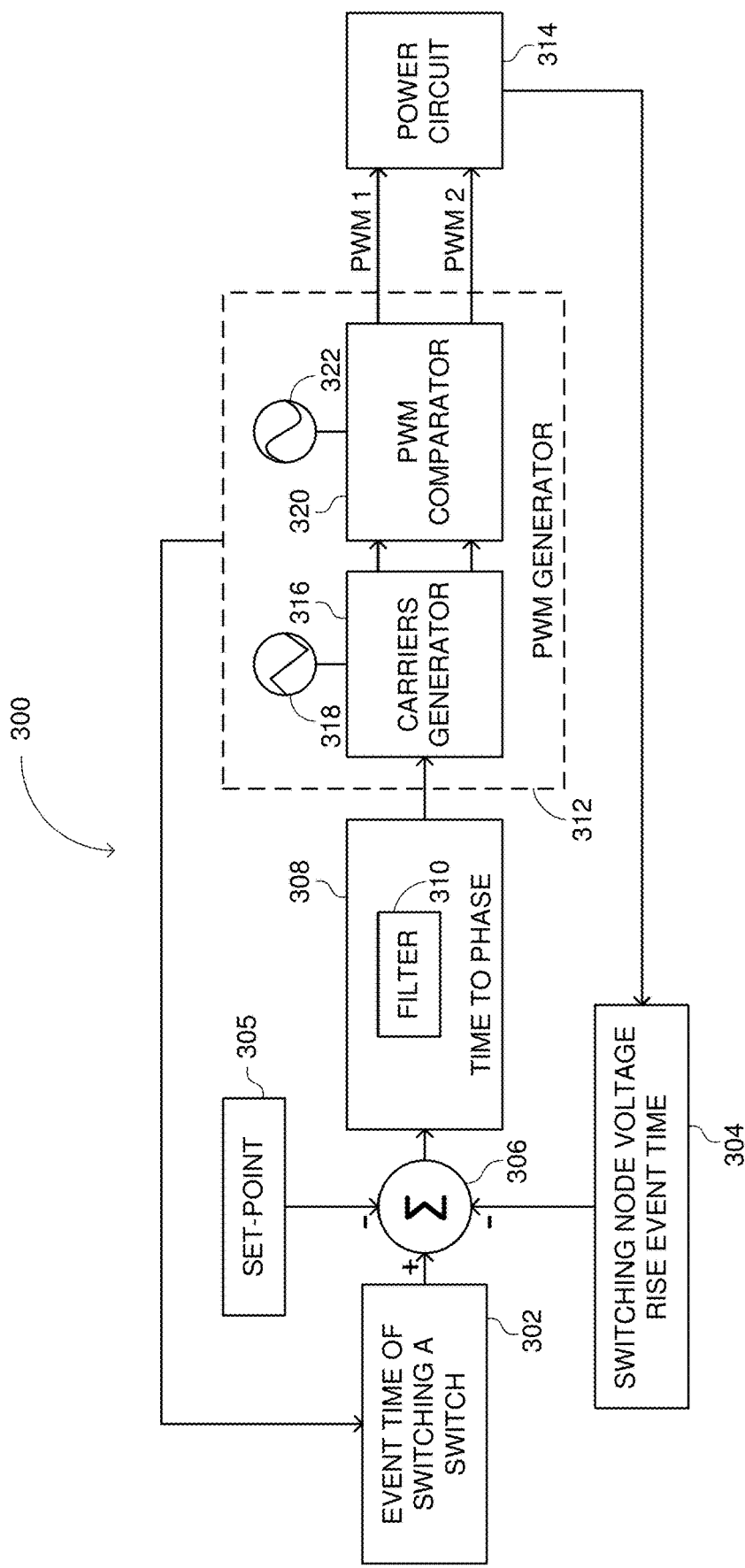
FIG. 3A shows an example of a control loop in a system according to an aspect of the disclosure herein.
Figure 3B:
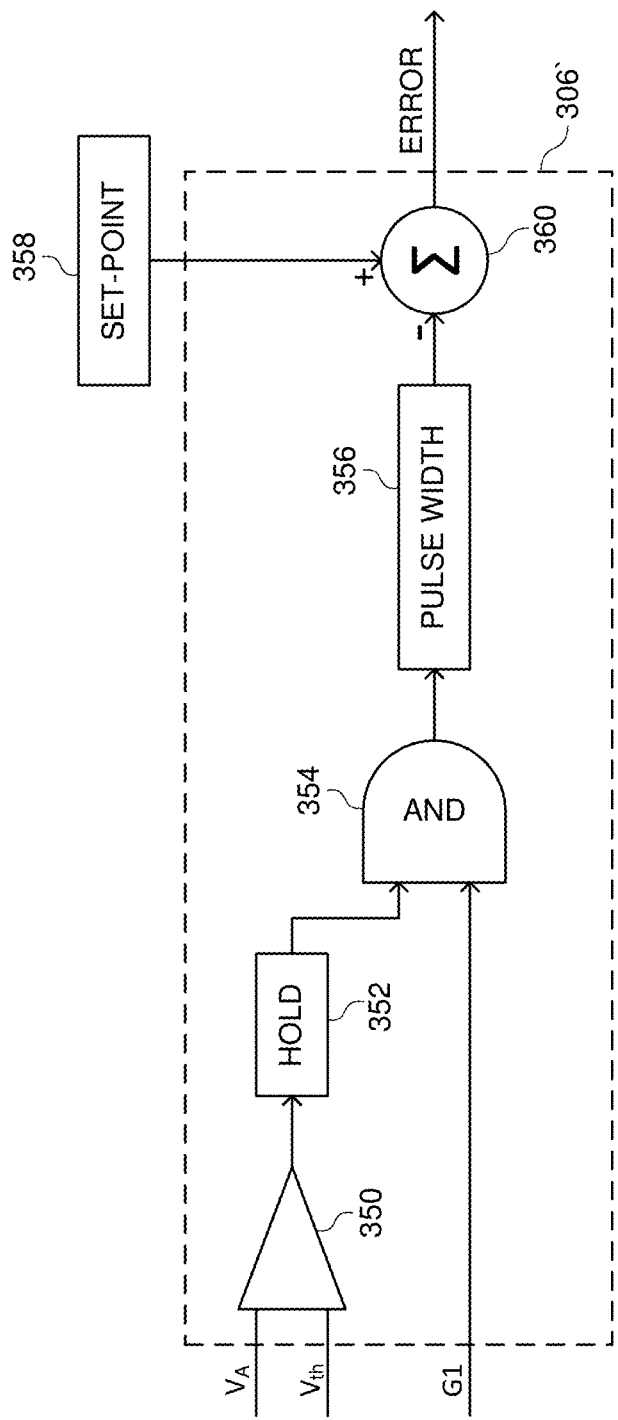
FIG. 3B shows an implementation example of several control blocks shown in FIG. 3A FIGS. 4A-4E show an example of timing diagram respectively, for various control scenarios of a power circuit according to an aspect of the disclosure herein.

Reference is now made to FIGS. 3A and 3B. FIG. 3A shows an example of a control loop 300 that may be implemented by controller 202 (FIG. 2) for determining a phase difference between two PWM signals, such as the first PWM signal and the second PWM signal discussed above and which may control switch legs $102_1$ and/or $102_2$ for ZVS. FIG. 3B shows an implementation example of portions of control loop 300. With reference to FIG. 3A, control loop 300 may be a closed control loop. In control loop 300, a switching event time of a switch in a switch leg of power circuit 314 may be detected in control block 302. For example, the switching event may be determined based on a PWM signal of a switch leg (e.g., a time at which the PWM signal controls a switch to transition between an off-state and an on-state). For example, a switching event time of switch S1 in switch leg $102_1$ may be determined based on the PWM signal of switch leg $102_1$, which may be received from PWM generator 312 (e.g., the first PWM signal 'PWM 1' may be fed back to block 302). For example, the switching event time of S1 may be a time in which the first PWM signal controls switch S1 to transition from an off-state to an on-state. For example, in such cases where switch S1 is implemented as a MOSFET transistor, the switching event may be a rise in the gate voltage of the transistor to a level of at least a threshold voltage.

In control block 304, a switching node voltage rise event time may be detected. The switching node voltage rise event time may be detected based a measurement of the voltage of the switching node (e.g., based on a measurement by sensors (s) 204—FIG. 2). For example, a switching node voltage rise event time of switch S1 in switch leg $102_1$ may be detected based on a measurement of the voltage at a switching node 'A' reaching a threshold voltage (e.g., Vdc, 3*Vdc/4, Vdc/2, Vdc/4). In control block 305, a set-point may be determined (e.g., a predetermined set-point based on control loop stability and convergence considerations). The set-point may be a value representing a system related time duration as further explained below (e.g., in conjunction with FIGS. 4A-4E), and may facilitate determining a phase difference correction, such as when switch S1 transitions from the off-state to the on-state before preferred ZVS conditions have occurred (e.g., the voltage across S1 may rise and exceed the threshold before capacitor C1 discharges).

In Control Block 306, a Time Difference Between the Switching Event Time of the Switch, the Switching Node Voltage Rise Event Time, and the Set-Point, May be Determined (e.g., Calculated), for Example, as Follows:

$$\varepsilon = T_S - T_R - SP \tag{15}$$

Where '$\varepsilon$' is an error (e.g., a timing error), '$T_S$' is the event time of switching a switch, '$T_R$' is the switching node voltage rise event time, and SP is the set-point. Such a subtraction may produce an error (e.g., a timing error) signal relating to the time difference between the switching time of the switch in the switch leg, and an expected time in which ZVS conditions may occur. For example, the time at which the voltage at switching node 'A' reaches a threshold and the set-point may be subtracted from the time of a switching event of switch S1. The use of a set-point may further be explained in conjunction with FIGS. 4A-4D.

In control block 308, a phase difference $\Delta\theta_{pwm}$ between a first PWM signal and a second PWM signal may be determined (e.g., convert) based on the time difference between the switching event time of the switch and the switching node voltage rise event time, and may provide a phase control signal for PWM generator control block 312. Control block 308 may comprise a LUT mapping time differences between event times and ZVS time of a switch, to a corresponding phase difference $\Delta\theta_{pwm}$ between the first PWM signal and the second PWM signal. Control block 308 may use a computational model mapping time differences between event times and ZVS time of a switch, to a corresponding phase difference $\Delta\theta_{pwm}$ between the first PWM signal and the second PWM signal. Control block 308 may comprise a filter block 310, which may filter the phase difference $\Delta\theta_{pwm}$ values. Filter block 310 may filter the time difference values directly (e.g., an LUT may not be used and the parameters of filter block 310 may be determined to convert time difference to phase difference). For example, filter block 310 may be implemented as a Low Pass Filter (LPF). For example, filter block 310 may be implemented as a proportional (P), an integral (I), or a derivative (D) filter, or any combination thereof (e.g., PI filter, PID filter, ID filter, or PD filter). In PWM generator control block 312, the first PWM signal for the first switch leg of power circuit 314 and the second PWM of the second switch leg of power circuit 314 may be generated, such as with the determined phase difference. For example, power circuit 314 may correspond to power circuit 100 (FIG. 1A). PWM generator 312 may generate a first PWM signal to first switch leg $102_1$ and a second PWM signal for second switch leg $102_2$.

PWM generator control block 312 may generate the first PWM signal and the second PWM signal based on the determined phase difference $\Delta\theta_{pwm}$. The PWM generator block 312 may include a carrier generator 316 and a PWM comparator 320. Carrier generator 316 may generate two phase shifted carriers based on a reference carrier 318 and the determined phase difference. PWM comparator 320 may compare the two carriers to a reference signal 322 to generate the two, phase shifted, first PWM signal and second PWM signal (e.g., where the first PWM signal and second PWM signal are phase shifted by a phase difference to $\Delta\theta_{pwm}$).

FIG. 3B shows an implementation example, such as of control blocks 302, 304, 305, and 306, for determining a timing error between the switching event time of the switch in the switch leg, and the expected ZVS time. In block 350, the measured voltage at switching node 'A', VA, may be compared to a threshold. If VA is at or above the threshold, a pulse of a predetermined duration may be generated at hold block 352. The predetermined duration may be related to the set-point (e.g., twice the duration of the set-point). AND gate 354 may output a pulse based on the control signal, G1, of switch S1 being high (e.g., transitioning switch S1 from the off-state to the on-state). The width of this pulse may be measured at block 356. In this implementation example, the measured pulse may be subtracted from a set-point 358 by adder 360. Thus, a timing error between the switching event time of the switch in the switch leg, and the expected ZVS time may be generated.

Reference is now made to FIGS. 4A-4E, which show examples of timing diagrams $400_1$-$400_5$ respectively, for various control scenarios of a power circuit according to the disclosure herein (e.g., power circuit 100—FIGS. 1A-1B). In the example of FIGS. 4A-4E, a switching node voltage rise event time may be determined based on a measurement of the voltage of switching node 'A', $V_A$, being at or above a threshold, Vth (e.g., Vdc, Vdc/2, 3*Vdc/4, Vdc/4). The switching node voltage rise event time may indicate the time at which the voltage of switching node 'A' reaches the threshold voltage. Timing diagrams $402_1$-$402_5$ may relate to the voltage at the switching node (e.g., the voltage at switching node 'A', $V_A$). Dotted lines $403_1$-$403_3$ in FIGS. 4A-4C may illustrate a desired voltage level at switching node 'A' for ZVS (e.g., had ZVS conditions occurred, Va would have risen according to hatched lines $403_1$-$403_3$). Timing diagrams $404_1$-$404_5$ may relate to a gate voltage $V_G$ of a switch (e.g., the gate voltage G1' of switch S1—FIG. 1A), and may relate to the switching event time of the switch (e.g., as explained above in conjunction with FIG. 1A or 3A). Hatched areas $406_1$-$406_5$ may relate to a time difference between the switching event time of the switch in the switch leg, and the expected ZVS time, where $V_E$ represents voltage level relating to the error signal (e.g., timing error from control block 306—FIG. 3A). Time diagrams $408_1$-$408_5$ may relate to a ripple current through a winding in a coupled inductor (e.g., current through first winding $108_1$ or through second winding $108_2$—FIG. 1A). In the example depicted in FIGS. 4A-4E, the set-point may be determined to correspond to the expected time duration for $V_A$ to rise from the threshold Vth to Vdc (e.g., when switch S1 is in a non-conducting state).

Figure 4A:
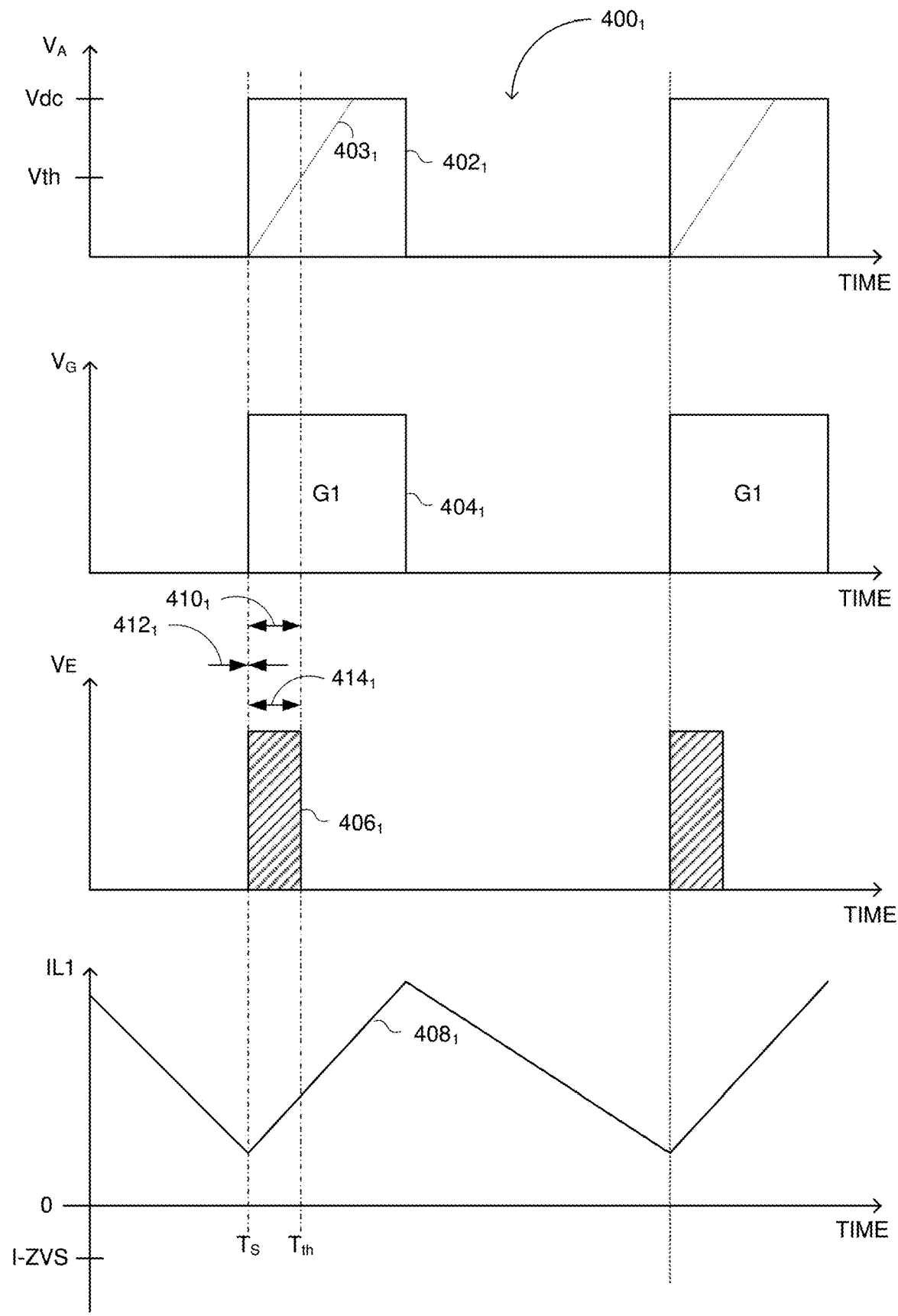

FIG. 4A shows an example in which a switch (e.g., switch S1) transitions from the off-state to the on-state, prior to ZVS condition. In the example of FIG. 4A, VG (e.g., the gate voltage of switch S1) rises at time Ts, before $V_A$ (e.g., the voltage at switching node 'A') reaches the threshold voltage, Vth (e.g., Va would have reached Vth at $T_{th}$). Therefore, $V_A$ rises to Vdc before $T_{th}$. The time difference $412_1$ between the switching event time of the switch (block 302—FIG. 3), and the time the switching node reaches the threshold voltage (block 304—FIG. 3) may be substantially zero. Subtracting the set-point $410_1$ results in a timing error $406_1$ (e.g., of duration $414_1$), having a negative value equal to the set-point. A negative value may indicate that the switch transitions from the off-state to the on-state of the switch occurred prior to ZVS conditions. In a case such as depicted in FIG. 4A, the current $408_1$ (e.g., through first winding $108_1$) might not become negative.

Figure 4B:
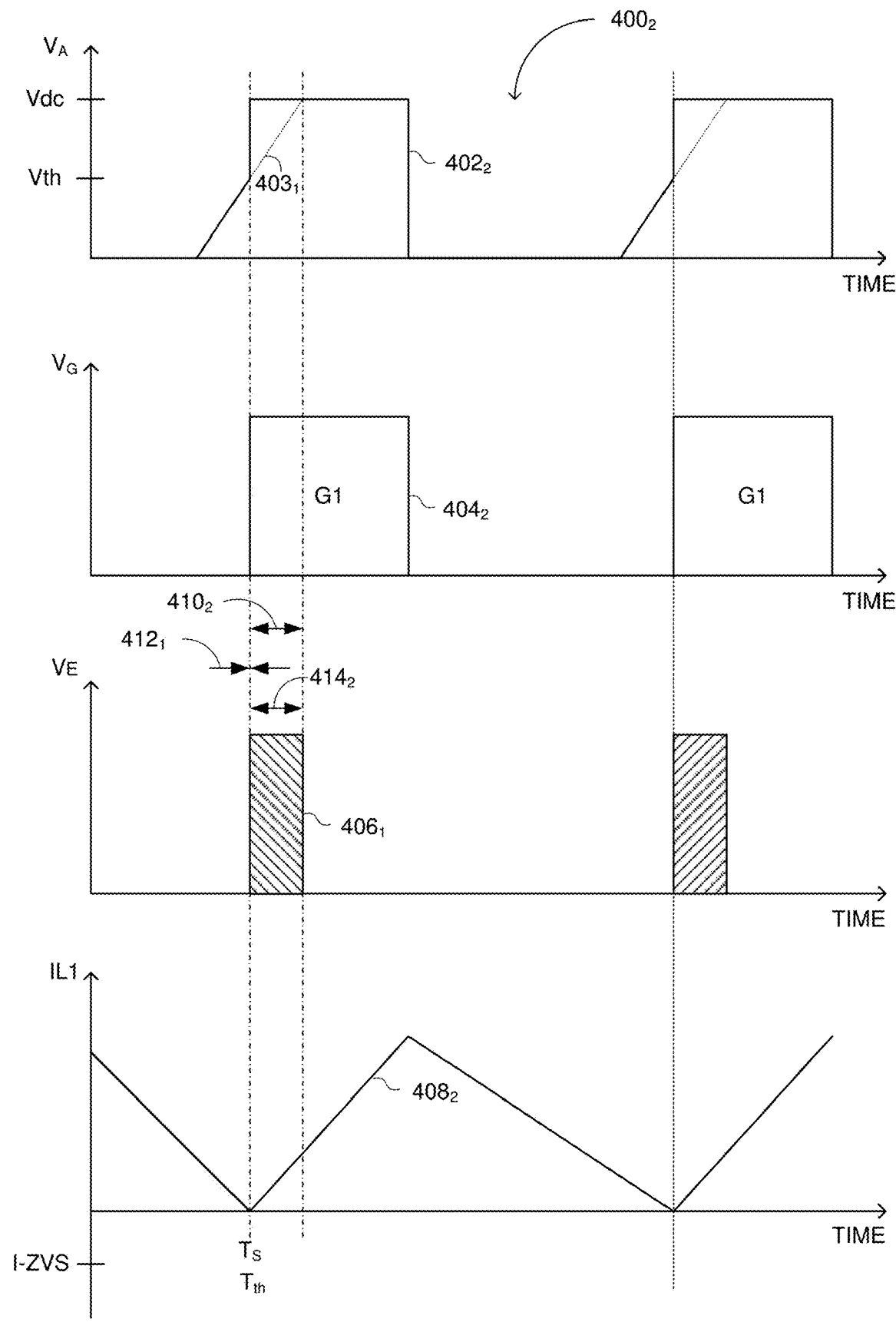

FIG. 4B shows an example in which a switch (e.g., switch S1) transitions from the off-state to the on-state, prior to ZVS condition. In the example of FIG. 4B, VG rises when VA reaches Vth at Tth (e.g., Ts=Tth). Therefore, VA also rises to Vdc at Tth, and the time difference $412_2$ between the switching event time of the switch (block 302—FIG. 3), and the switching node voltage rise event time (block 304—FIG. 3) may be substantially zero. Subtracting the set-point $410_2$ results in a timing error $406_2$ (e.g., of duration $414_2$), having a negative value equal to the set-point as in FIG. 4A. In a case such as depicted in FIG. 4B, the current $408_2$ (e.g., through first winding $108_1$) might not become negative.

Figure 4C:
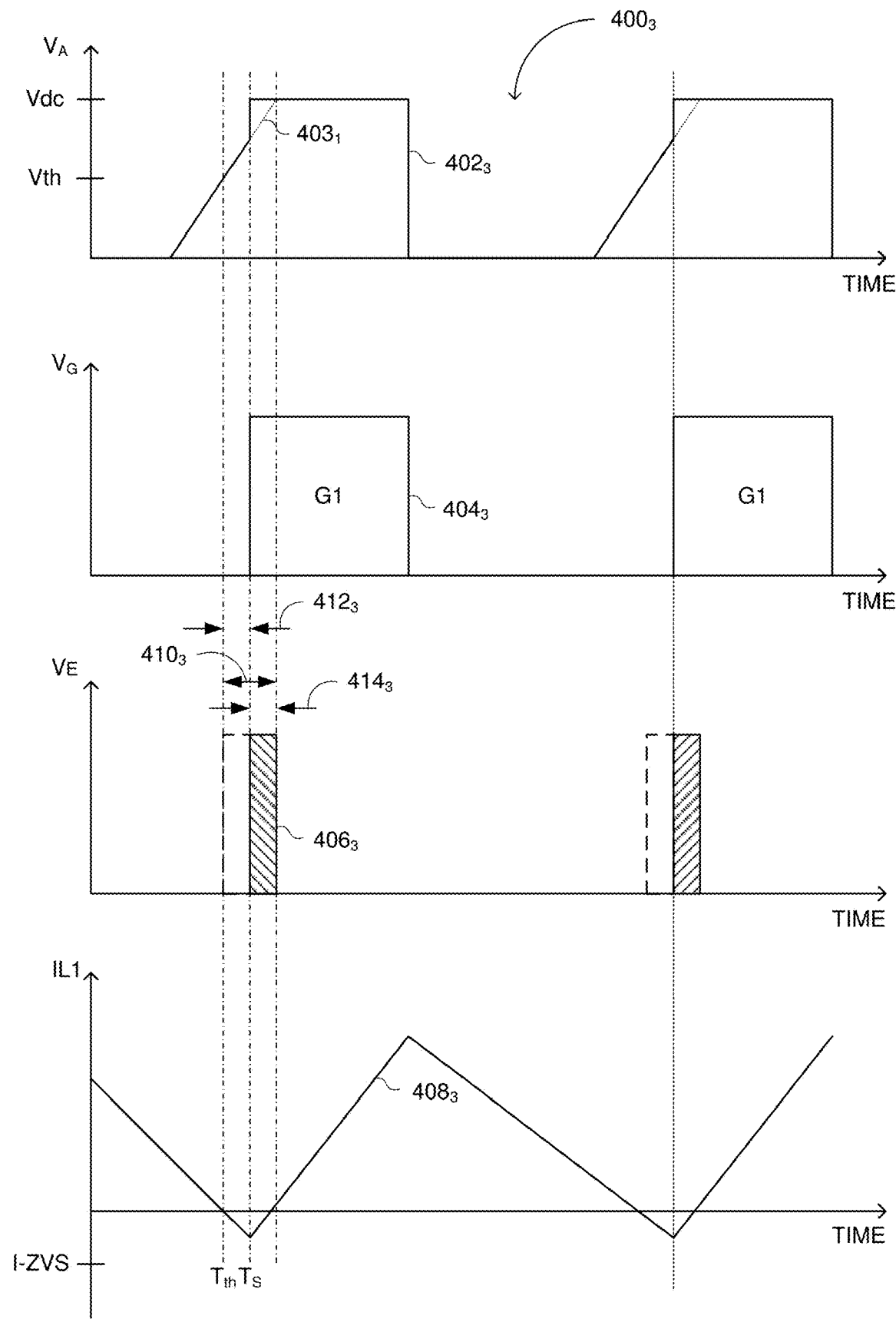

FIG. 4C shows an example in which the gate voltage, VG, of the switch rises at time Ts after $V_A$ reaches Vth at $T_{th}$. The time difference $412_3$ between the switching event time of the switch (block 302—FIG. 3), and the time the switching node reaches the threshold voltage (block 304—FIG. 3) may be non-zero, but smaller than the set-point $410_3$. Subtracting the set-point $410_3$ from the time difference $412_3$ results in a timing error $406_3$ (e.g., of duration $414_3$), having a negative value smaller than the set-point. In a case such as depicted in FIG. 4C, the current $408_3$ (e.g., through first winding $108_1$) may become negative, but at a level (based on magnitude and duration of the negative current) that might not be sufficient for ZVS (e.g., a negative level equal or higher than I-ZVS).

Figure 4D:
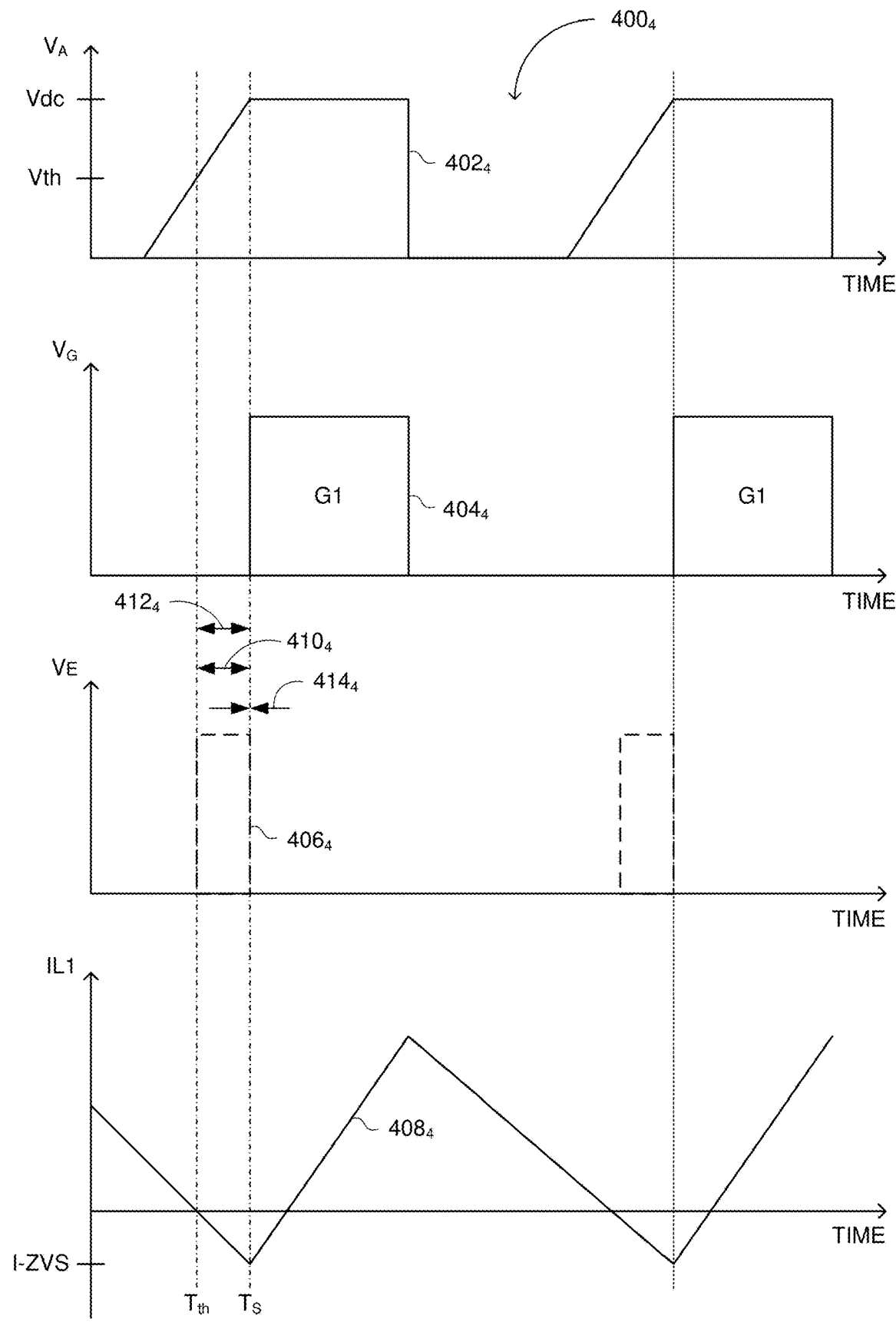

FIG. 4D shows an example in which the gate voltage, $V_G$, of the switch rises at time Ts, when $V_A$ reaches Vdc (e.g., a duration of the set-point after $V_A$ reaches Vth). The time difference $412_4$ between the switching event time of the switch (block 302—FIG. 3) and the time the switching node reaches the threshold voltage (block 304—FIG. 3) may be equal to the set-point $410_4$. Subtracting the set-point $410_4$ from the difference $412_4$ results in a timing error $406_4$ being substantially zero (e.g. no hatched area, and as indicated by arrows $414_4$). In a case such as depicted in FIG. 4D, the current $408_4$ (e.g., through first winding $108_1$) may be at I-ZVS.

Figure 4E:
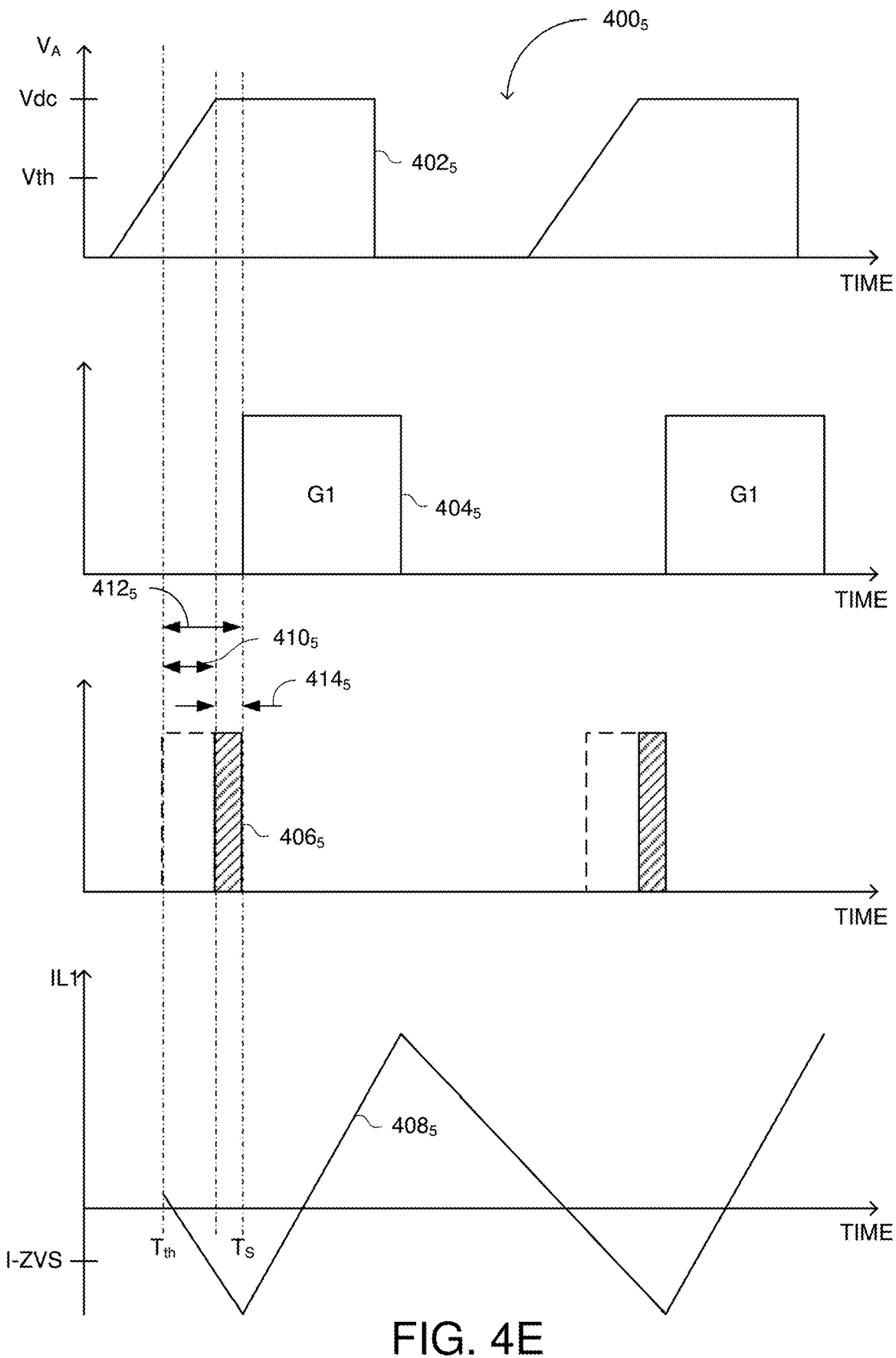

FIG. 4E shows an example in which the gate voltage, VG, of the switch rises at time Ts after $V_A$ reached Vdc. The difference $412_5$ between the switching time of the switch (block 302—FIG. 3) and the time the switching node reaches threshold voltage (block 304—FIG. 3) may be larger than the set-point $410_5$. Subtracting the set-point $410_5$ from the difference $412_5$ results in a timing error $406_5$ (e.g., of duration $414_5$), being positive (e.g. the hatched area). This may be interpreted that the switch transitions from the off-state to the on-state after ZVS conditions occur. In a case such as depicted in FIG. 4E, the current $408_5$ (e.g., through first winding $108_1$) may be lower than I-ZVS.

In FIGS. 4A-4E, dotted lines $403_1$-$403_3$ and time diagrams $402_3$-$402_5$ are shown as increasing linearly for clarity of the figure and explanation. However, it may be noted that is not necessarily always the case. For example, voltage $V_A$ at node 'A' may rise exponentially (e.g., in case capacitor C1 is discharged).

Referring to FIGS. 1A-1B, 3A-3B and 4A-4E, the ripple current through winding $108_1$ or $108_2$ may be controlled to correspond to I-ZVS, by controlling the switching times of S1 and S1_D (and of S2 and S2_d), based on the difference (e.g., the result of the subtraction in control block 306) between switching event time of switch S1, the switching node voltage rise event time of switching node 'A', and a set-point. As mentioned above (e.g., in conjunction with FIG. 3A), the set-point may facilitate determining a phase difference between the current flowing through first windings $108_1$ and second winding $108_2$, in case switch S1 transitions from the off-state to the on-state before preferred ZVS conditions have occurred (e.g., as depicted in FIGS. 4A, 4B and 4C, since $V_A$ rises due to the switching of S1 and not due to a negative current). For example, the set-point may correspond to maximum time-step correction (e.g., from which a corresponding phase correction may be derived), in instances in which the switching event time occurred before the preferred ZVS conditions have occurred. Furthermore, determining the phase difference between the first PWM signal controlling first switch leg $102_1$ and the second PWM signal controlling second switch leg $102_2$ may account for various system related constraints such as signal delays, switch-rise or fall-time and the like. It is noted that a switch rise time may be different from a switching node voltage rise event time. A switch rise-time may relate to the time duration a switch transitions from a non-conducting state to a conducting state. A switch fall-time may relate to the time duration a switch transitions from a conducting state to a non-conducting state.

Figure 5A:
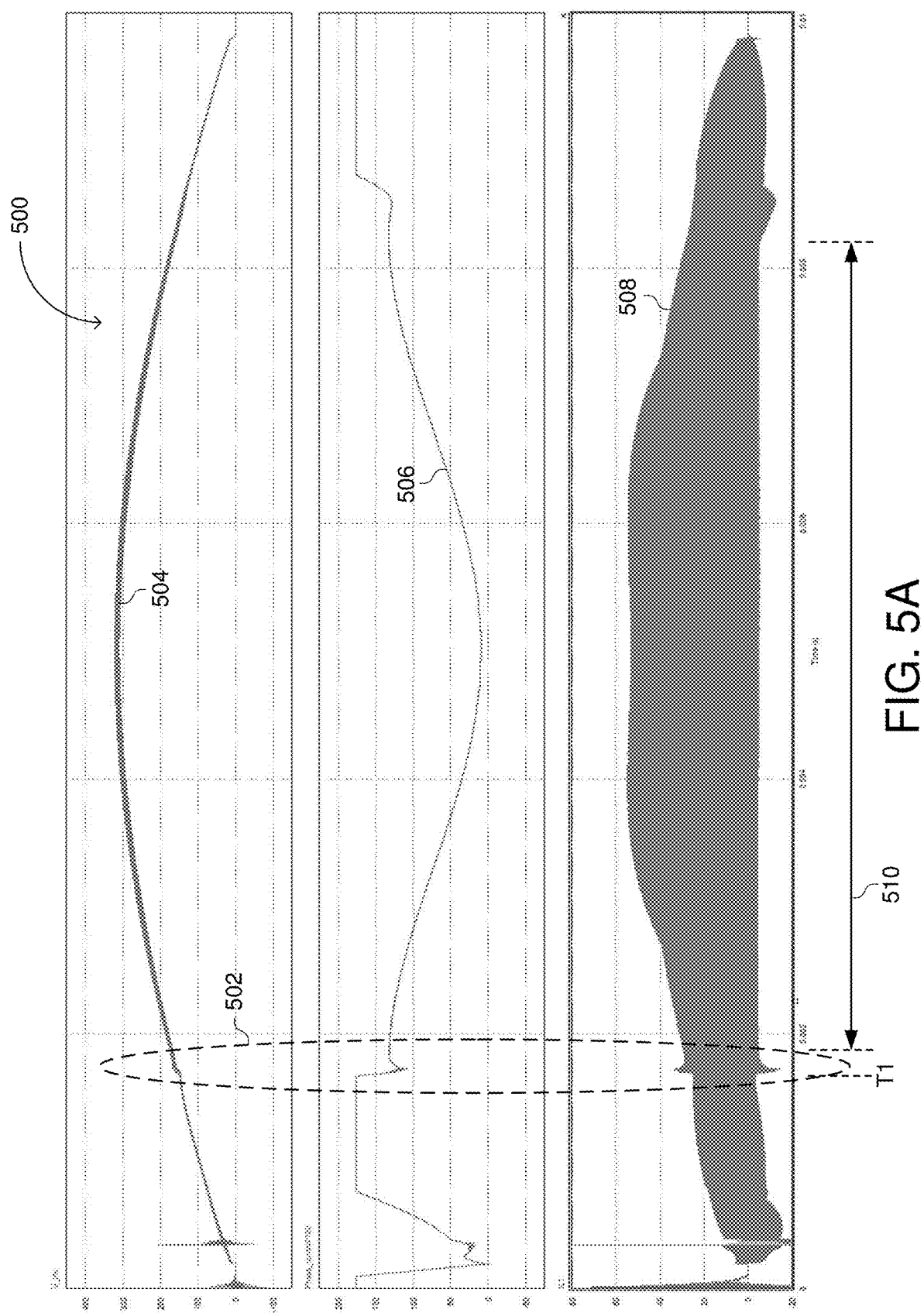
FIGS. 5A and 5B show an example of a diagrams of signals of a power circuit according to an aspect of the disclosure herein.
Figure 5B:
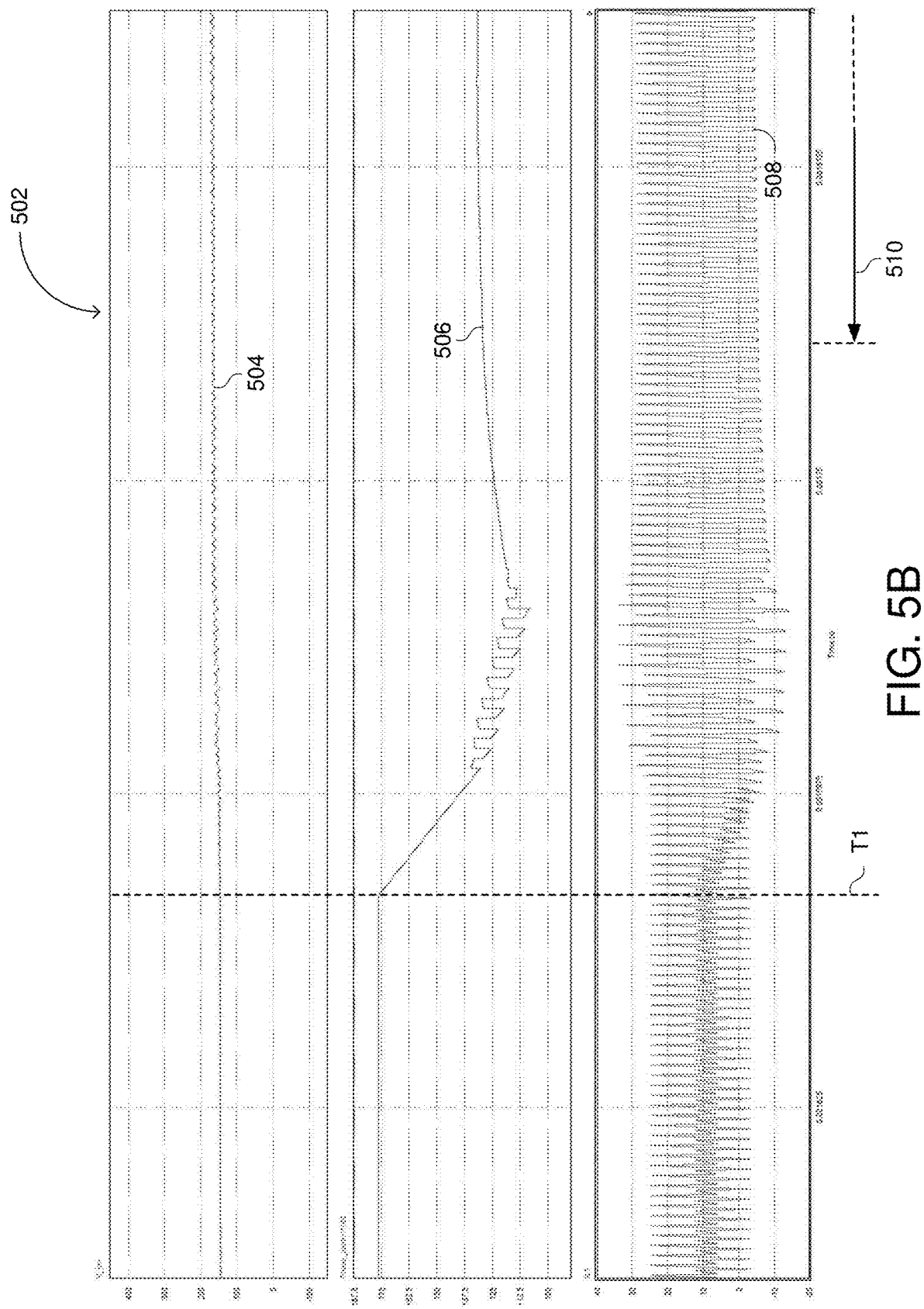

Reference is now made to FIGS. 5A and 5B which show examples of diagrams 500 of signals in a power circuit (e.g., power circuit 100—FIG. 1A) according to aspects of the disclosure herein. The signals in diagrams 500 show the effects of controlling a phase difference between the currents flowing through the windings of the coupled inductor. FIGS. 5A and 5B depict voltage across a load (e.g., voltage 504 across load 106 at node C of FIG. 1A), the phase control signal 506 (e.g., at the output of time-phase block 308—FIG. 3A), and a ripple current 508, for example, through first winding $108_1$, all versus time. In the example shown in FIGS. 5A and 5B, controlling the phase between the two PWM signals, such as may be described above, may start when the negative current through winding $108_1$ is not sufficient for ZVS. FIG. 5B shows a "zoomed-in" region 502 of diagram 500, where control of the phase difference between the currents flowing through the windings of the coupled inductor may be initiated. As such, in FIGS. 5A and 5B, controlling the phase between the two PWM signals may be initiated at time instant T1, for the duration of time interval 510 (FIG. 5A). As depicted in FIG. 5A, during time interval 510, the negative level of current 508 may be the same, while the peak level of inductor current 508 may change, where the negative level of current 508 is sufficient for ZVS (e.g., I≥I-ZVS) of a switch (e.g., S1 or S1_D) in the corresponding switch leg (e.g., switch leg $102_1$ or $102_2$). As seen in FIG. 5A, at instances prior to or after interval 510, where the phase between the currents through the coupled inductor is not controlled, the negative value of the inductor current may vary, and may be lower or higher than I-ZVS.

Figure 6A:
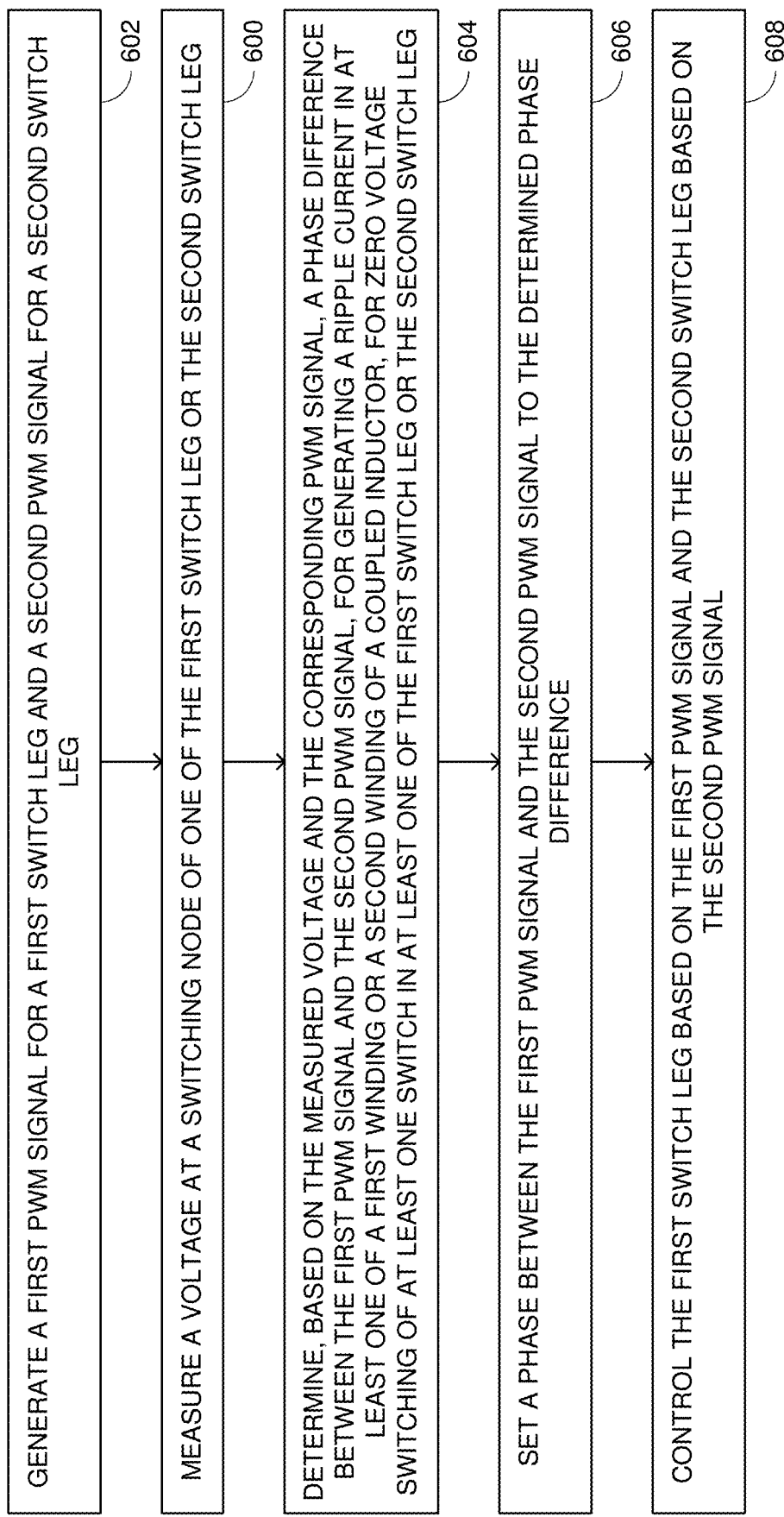
FIGS. 6A and 6B show an example of methods for ZVS according to an aspect of the disclosure herein.
Figure 6B:
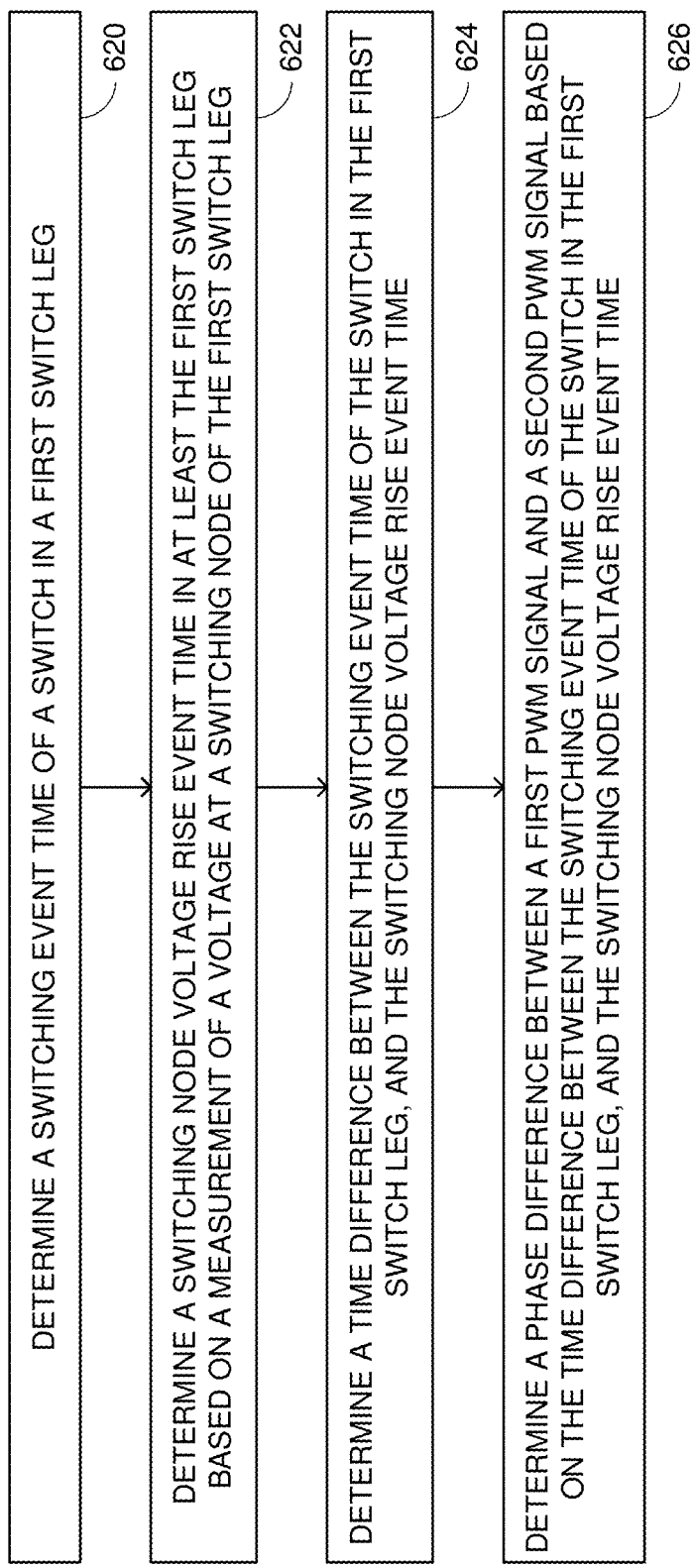

Reference is now made to FIGS. 6A and 6B. FIG. 6A shows an example flow chart of a method for ZVS in a power converter (e.g., power circuit 100—FIG. 1), which may comprise a coupled inductor (e.g., power converter 104—FIG. 1) based on a phase difference between currents flowing through the winding in the coupled inductor. FIG. 6B shows an example method for determining the phase difference between the two PWM signals, which may control respective switch legs (e.g., switch leg $102_1$ and $102_2$), for generating currents in windings of the coupled inductor for ZVS. With reference to FIG. 6A, in step 600, a PWM generator (e.g., PWM generator 312—FIG. 3A) may generate a first PWM signal for a first switch leg (e.g., switch leg $102_1$—FIG. 1A) and the second PWM signal for the second switch leg based (e.g., switch leg $102_1$—FIG. 1A).

In step 602, a sensor (e.g., sensors(s) 204) may measure a voltage at a switching node (e.g., switching node 'A' or switching node 'B'—FIG. 1A) of one of the first switch leg or the second switch leg.

In step 604, a controller (e.g., controller 202—FIG. 2) may determine, based on the measured voltage and the corresponding PWM signal, a phase difference between the first PWM signal and the second PWM signal, for generating a ripple current in at least one of a first winding (e.g., first winding $108_1$) or a second winding (e.g., second winding $108_2$) of a coupled inductor (e.g., coupled inductor 104), for ZVS of at least one switch (e.g., switch S1 or switch S1_D) in at least one of the first switch leg (e.g., switch leg $102_1$)

or the second switch leg (e.g., switch leg $102_1$). The coupled inductor may be coupled to the first switch leg and the second switch legs. The ripple current through at least one of the first winding or the second winding of the coupled inductor, may have negative value which is not smaller than a current sufficient for ZVS (e.g., I≥I-ZVS, as may be shown in FIG. 1B, or 5A). For example, with reference to FIGS. 1A and 2, coupled inductor 104 is coupled to first switch leg $102_1$ and to second switch leg $102_2$.

In step 604, the controller may set a phase between the first PWM signal and the second PWM signal to the determined phase difference.

In step 608, the controller may control (e.g., for switching) the first switch leg based the first PWM signal, and/or control the second switch leg based on the second PWM signal.

Reference is now made to FIG. 6B, which is an example flowchart of a method for determining a phase difference between two PWM signals for ZVS of a switch in a switch leg, according to aspects of the disclosure herein, where the two PWM signals are for controlling corresponding two switch legs. In step 620, a switching event time of a switch in a first switch leg may be detected. For example, in FIG. 1A, the switching event time of switch S1 in first switch leg $102_1$ may be determined (e.g., based on the PWM signal of first switch leg $102_1$). For example, the switching event time of S1 may be a time in which the first PWM signal controls switch S1 to transition between an off-state to an on-state. For example, when switch S1 is implemented as a MOSFET transistor, the switching event time may be the time at which a rise in the gate voltage of the transistor has occurred. With reference to FIG. 2, controller 202 may detect the switching event time of a switch (e.g., switch S1) in the first switch leg (e.g., switch leg $102_1$). For example in FIG. 3A, the switching event time of the switch may be determined in block 302 based on a signal from PWM generator 312.

In step 622, a switching node voltage rise event time, in at least the first switch leg may be determined based on a measurement of a voltage at a switching node of the first switch leg. For example, the switching node voltage rise event time may relate to the time at which switching node reaching a threshold voltage. For example, in FIG. 1A, the switching node voltage rise event time of switching node 'A' in first switch leg $102_1$ may be determined based on a measurement of a voltage at switching node 'A'. With reference to FIG. 2, microcontroller 206 may determine the switching node voltage rise event time. For example, in FIG. 3A, the switching node voltage rise event time may be determined in block 304 based on a measurement of the voltage at the switching node of the first switch leg in power circuit 314.

In step 624, a time difference between a switching event time of the switch in the first switch leg, and the switching node voltage rise event time in the first switch leg, may be determined. A time set-point may further be subtracted from this difference. Thus, a timing error between the switching event time of the switch in the switch leg, and the expected ZVS time may be determined. For example, in FIG. 2, microcontroller 206 may determine a time difference between a switching event time of the switch in the first switch leg, and the switching node voltage rise event time of the switch in first switch leg $102_1$. For example, in FIG. 3A, a time difference between a switching event time of the switch in the first switch leg, and the switching node voltage rise event time in the first switch leg may be determined in block 306. A determined set-point at block 305 may also be subtracted.

In step 626, a phase difference between a first PWM signal and a second PWM signal may be determined (e.g., calculated or based on a lookup table) based on the time difference between the switching event time of the switch in the first switch leg, and the switching node voltage rise event time of the switch in the first switch leg. For example, the phase difference may be determined based on Equations (1), (2), (11)-(14) above, Vdc, and/or the capacitance of capacitor C1. For example, in FIG. 2, microcontroller 206 may determine a phase difference $\Delta\theta_{pwm}$ between the first PWM signal and the second PWM signal based on a difference between the switching event time of switch S1 in first switch leg $102_1$, and the switching node voltage rise event time of switch S1 in first switch leg $102_1$. For example, in FIG. 3A, a phase difference between the first PWM signal and the second PWM signal may be determined in time to phase block 308.

Figure 7:
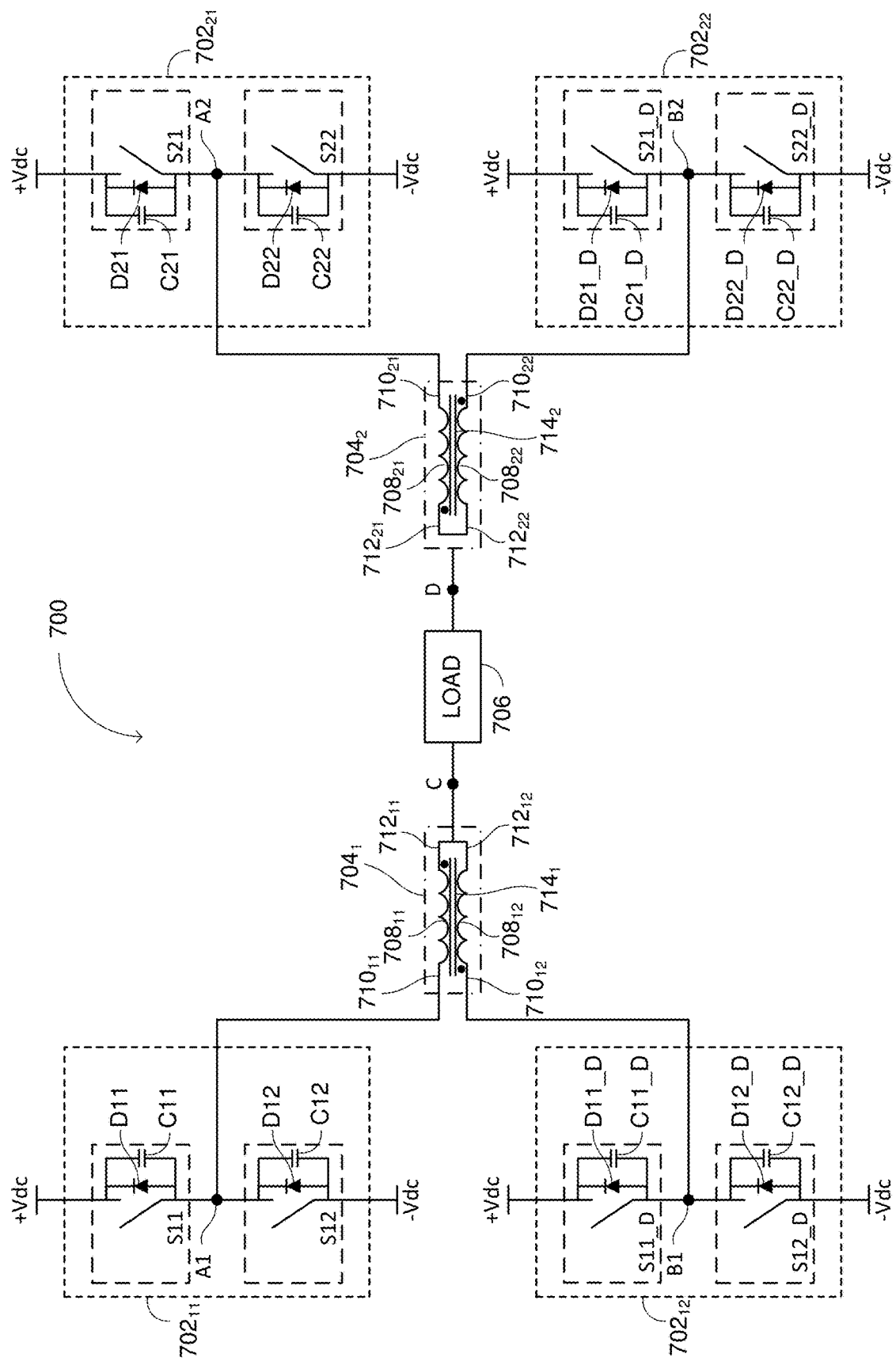
FIG. 7 shows an example of a power circuit according to aspects of the disclosure herein.

The description above relates to a power circuit employing a half-bridge configuration employing two switch legs. As mentioned above, in such a configuration it may be sufficient to measure the voltage at one of the switching nodes (e.g., either switching node 'A' or switching node 'B'—FIG. 1A). The disclosure herein relates also to a power circuit employing a full-bridge configuration. Reference is now made to FIG. 7, which shows an example inverter 700 having a full-bridge configuration. Power circuit 700 may comprise four switch legs, a first switch leg $702_{11}$, a second switch leg $702_{12}$, a third switch leg $702_{21}$, a fourth switch leg $702_{22}$, and two coupled inductors: a first coupled inductor $704_1$ and a second coupled inductor $704_2$. First coupled inductor $704_1$ and second coupled inductor $704_2$ may be similar to coupled inductor 104 (FIG. 1A). First switch leg $702_{11}$, second switch leg $702_{12}$, third switch leg $702_{21}$, and fourth switch leg $702_{22}$ may be similar to first switch leg $102_1$ and/or second switch leg $102_2$ (FIG. 1A).

First switch leg $702_{11}$ may comprise two switches, S11 and S12. Second switch leg $702_{12}$ may comprise two switches, S11_D and S12_D. Third switch leg $702_{21}$ may comprise two switches, S21 and S22. Fourth switch leg $702_{22}$ may comprise two switches, S21_D and S22_D. Each one of switches S11, S12, S11_D, S12_D, S21, S22, S21_D and S22_D may comprise a corresponding diode and a capacitor (e.g., a parasitic capacitor) and may be configured to transition between an off-state and an on-state. Switches S11 and S12 may be coupled in series at a switching node 'A1'. Switches, S11_D and S12_D may be coupled in series at a switching node 'B1'. Switches, S21 and S22 may be coupled in series at a switching node 'A2'. Switches, S21_D and S22_D may be coupled in series at a switching node 'B2'. The serially coupled switches S11 and S12, S11_D and S12_D, S21 and S22, and S21_D and S22_D may be coupled across a supply voltage (e.g., ±Vdc).

Coupled inductor $704_1$ may comprise a first winding $708_{11}$ comprising a first end $710_{11}$ and a second end $712_{11}$, and a second winding $708_{12}$ comprising a first end $710_{12}$ and a second end $712_{12}$. First winding $708_{11}$ and second winding $708_{12}$ may be wound around a common core $714_1$. The first end $710_{11}$ of first winding $708_{11}$ may be coupled with node A1. The first end $710_{12}$ of second winding $708_{12}$ may be coupled with node B1. Second end $712_{11}$ of first winding $708_{11}$ may be coupled to the second end $712_{12}$ of the second winding $708_{12}$ at node 'C'. Coupled inductor $704_2$ may comprise a first winding $708_{21}$ comprising a first end $710_{21}$ and a second end $712_{21}$, and a second winding $708_{22}$ comprising a first end $710_{22}$ and a second end $712_{22}$. First winding $708_{21}$ and second winding $708_{22}$ may be wound around a common core $714_2$. The first end $710_{21}$ of first winding $708_{21}$ may be coupled with node A2. The first end $710_{22}$ of second winding $708_{22}$ may be coupled with node B2. Second end $712_{21}$ of first winding $708_{21}$ may be coupled to the second end $712_{22}$ of the second winding $708_{22}$ at node 'D'. Load 706 may be coupled between node 'C' and node 'D' may be coupled to a load 706. Power circuit 700 may be configured to convert DC power to AC power by transitioning switches S11, S12 S11_D, S12_D, S21, S22, S21_D and S22_D between an off-state. Switches S11, S12 S11_D, S12_D, S21, S22, S21_D and S22_D may be implemented as, for example, MOSFETs, GaN based transistors, SiC transistors, IGBTs, BJTs, or any other types of transistors.

Switch legs $702_{11}$ and $702_{12}$ may be operated by a first PWM signal (and the complementary thereof). Switch legs $702_{21}$ and $702_{22}$ may be operated by a second PWM signal (and the complementary thereof), where the second PWM signal may be phase shifted relative to the first PWM signal by a phase difference $\Delta\theta_{pwm}$ as described above. It is noted that the phase difference $\Delta\theta_{pwm}$ between the first PWM signal and the second PWM signal may be determined based on a measurement of the voltage at one or more of switching nodes A1, A2, B1, or B2. The first PWM signal operates switch legs $702_{11}$ and $702_{12}$, and the second PWM signal operates switch legs $702_{21}$ and $702_{22}$. Thus, for similar switch legs $702_{11}$, $702_{12}$, $702_{21}$ and $702_{22}$, and similar coupled inductors $704_1$ and $704_2$, the phase difference between the first PWM signal and the second PWM signal may result in the same equivalent inductances of the windings in coupled inductors $704_1$ and $704_2$.

The description above of the power circuits of FIGS. 1A and 7 is merely exemplary. The disclosure herein may relate to other power circuits employing at least two switch legs and coupled inductor. For example, such power circuits may be DC-AC converters or DC-DC converters or AC-DC converters (e.g., rectifiers). For example, such converters may be converters such as half-bridge converters, full-bridge (H-Bridge) converters, flying capacitor converters, HERIC converters, cascaded-H-bridge converters, Neutral Point Clamped (NPC) converters, A-NPC converters, or a T-type NPC converters. The converters may output two or more voltage levels (i.e. may be two-level or multilevel converters).

According to the disclosure herein, a phase difference between the first PWM signal and the second PWM signal may be determined based on a measurement of the voltage at switching node 'A1', and a measurement of the voltage at switching node A2' (referring to FIG. 7). Sensor(s) 204 (FIG. 2) may include a voltage sensor at switching node 'A2'. Microcontroller 206 may average (e.g., as a simple average or a weighted average) the phase difference determined based on the measurement of the voltage at switching node 'A1' and the phase difference determined based on the measurement of the voltage at switching node A2'.

In the description above, a switching node voltage rise event time of a switch leg (e.g., referring to FIG. 1A, switch leg $102_1$ or switch leg $102_2$) may be employed to determine ZVS conditions. According to the disclosure herein, the current through a winding or windings of a coupled inductor (e.g., of coupled inductor 104) may be employed to determine ZVS conditions. For example, a current sensor may be employed to measure the current through winding $108_1$ or winding $108_2$ of coupled inductor 104 and microcontroller 206 (FIG. 2) may determine when the inductor current reaches I-ZVS. According to the disclosure herein, a switching node electrical characteristic event time may be determined as the switching event time, where the electrical characteristic is one of a voltage at a switching node or a switch leg current.

As described above, the currents through the windings of a coupled inductor may also depend on the switching frequency. According to the disclosure herein, the ripple current in a winding may be controlled by controlling the switching frequency (e.g., the frequency of the first PWM signal and of the second PWM signal) of the switches. The switching frequency may be controlled (e.g., increased or decreased) in addition to controlling the phase difference between the first PWM signal and the second PWM signal. Controlling the switching frequency provides an additional degree of freedom (e.g., in addition to the phase difference between the PWM signals) to optimize the ripple current through the winding or windings. For example, the switching frequency may be stepped up, or down (e.g., in discrete steps). The switching frequency may be determined based on the amplitude of the ripple current (e.g., peak to peak value). For example, at high ripple current amplitude the switching frequency may be reduced, and at low ripple current amplitude the switching frequency may be increased (e.g., since the amplitude of the ripple current is inversely proportional to the switching frequency as may be described above in Equation (1)). To that end, with reference to FIGS. 2 and 3A, sensors(s) 204 may measure the amplitude of the ripple current through the winding $108_1$ or $108_2$, and provide a signal relating to this amplitude to PWM generator 312. PWM generator 312 may include circuitry (e.g., control logic), which increases or decreases the frequency of the carriers generated by carriers generator 312. Controlling the switching frequency may reduce the expectation of the error signal (e.g., the expectation of the timing error output of block 306—FIG. 3A).

The description above may relate to determining a phase difference correction for controlling a ripple current of a winding or windings in a coupled inductor for ZVS, based on time difference measurements. It is noted that the disclosure herein is not limited thereto. The phase difference correction for controlling a ripple current for ZVS may be determined on phase difference measurements directly. In such cases, only a PID filter may be used instead of an LUT or an LUT in combination with a filter (e.g., as described above in FIG. 3A) for determining the required phase difference correction between the first PWM signal and the second PWM signal.

In a power circuit according to aspects of the disclosure herein it may beneficial to balance the currents flowing through the windings of the coupled inductor (e.g., due to mismatches such as in the components of the switching legs $102_1$ and $102_2$, or between first winding $108_1$ and second winding $108_2$). For example, and with reference to FIG. 1A, in instances in which the current flowing through first winding $108_1$ is not the same as the current flowing through second winding $108_2$ (e.g., the currents though windings $108_1$ and $108_2$ are not balanced), a net current may result which may saturate core 114. Also, in instances in which the currents though first winding $108_1$ and second winding $108_2$ are not balanced, the switching timing at which ZVS conditions occur in switch S1 and switch S1-D may be different. The balance between the currents through first winding $108_1$ and second winding $108_2$ may be related to (e.g., affected by) the phase difference between these currents (e.g., the phase difference between the currents flowing through winding first $108_1$ and second winding $108_2$ may affect the balance between these currents). Aspects of the disclosure herein may provide a control loop which may comprise a current balancing loop, where the parameters of a controller in the control loop may be related to the phase difference between the currents flowing through the windings of the coupled inductor.

Figure 8:
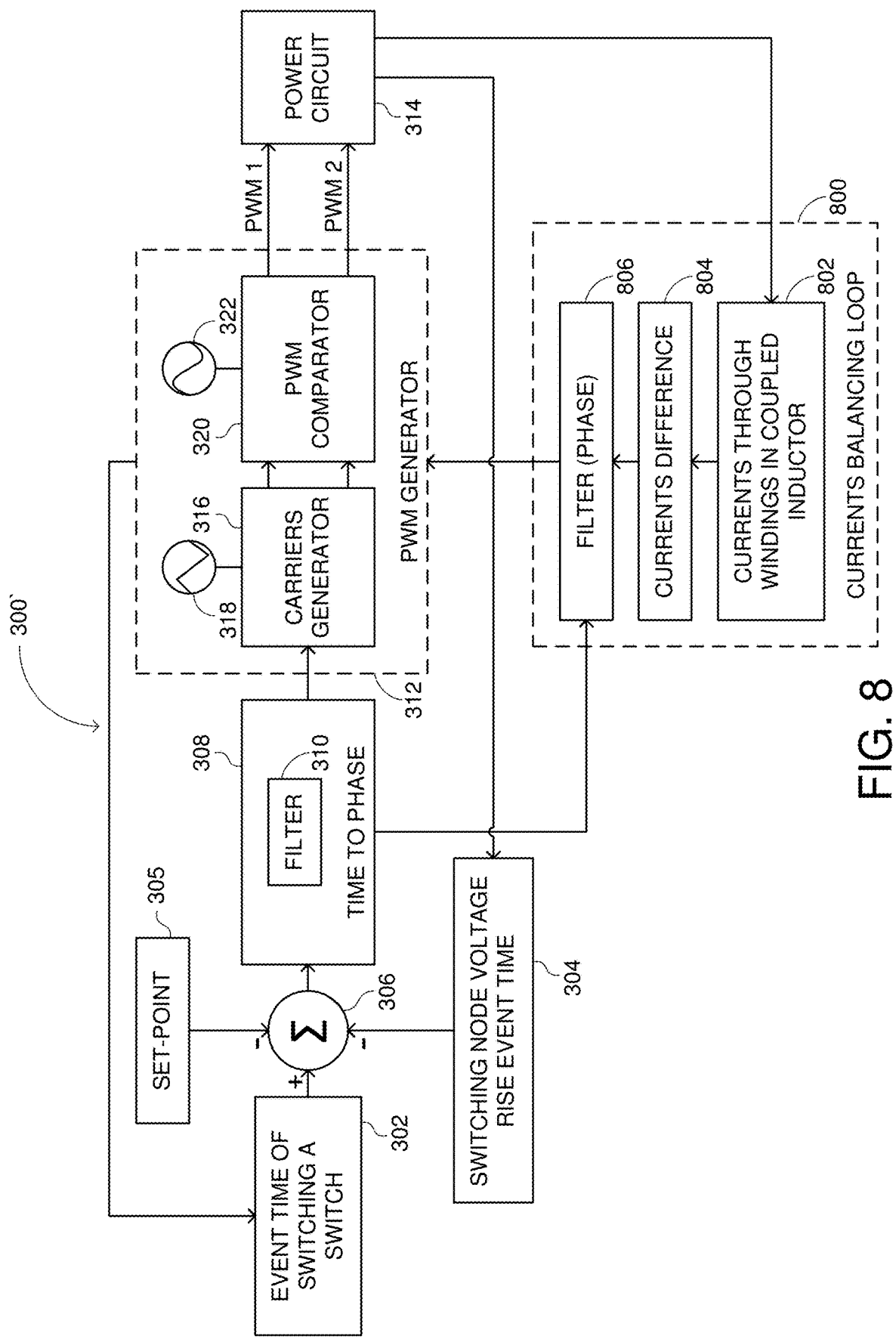
FIG. 8 shows an example of a control loop in a system according to an aspect of the disclosure herein.

Reference is now made to FIG. 8, which shows a control loop 300' similar to control loop 300 (FIG. 3A) with a currents balancing control loop for balancing the currents between the windings in the coupled inductor. In the example described in FIG. 8, control loop 300' (e.g., similar to control loop 300 (FIG. 3A) further comprises currents balancing control loop 800. Control loop 800 may be a closed control loop. In currents balancing control loop 800, the current through winding $108_1$ and the current through winding $108_2$ may be measured in control block 802 (e.g., by sensors (s) 204—FIG. 2). In control block 804, a difference between the current through winding $108_1$ and the current through winding $108_2$ may be determined. The current balancing loop may maintain this difference to be substantially zero. In filter block 806 a PWM correction may be determined for the first PAM signal and the second PAM signal, based on the difference between the current through winding $108_1$ and the current through winding $108_2$. For example, the correction may relate to a value or percentage of increase or decrease to the duty cycle of the first PWM signal or of the second PWM signal.

As mentioned above, the phase difference between the currents flowing through windings $108_1$ and $108_2$ may affect the balance between these currents. Therefore, as may be shown in FIG. 8, the PWM correction determined in filter block 806 may be based on the phase difference between the current through winding $108_1$ and the current through winding $108_2$ determined in time to phase block 308. Filter block 806 may receive the phase difference correction from time to phase block 308 (e.g., which may be different from filter block 806) and use that phase difference correction. For example, filter block 806 may be implemented as a proportional (P), an integral (I), or a derivative (D) filter, or any combination thereof (e.g., PI filter, PID filter, ID filter, or PD filter), where the parameters of the filter may depend on the phase difference (e.g., the filter coefficients may be depend on the phase difference between the PWM signals, where the phase difference may be determined from the output of control block 310).

Various aspects will be highlighted in a set of numbered clauses herein. These aspects are not to be interpreted as being limiting of the invention or inventive concept, but are provided merely to highlight some features as described herein, without suggesting a particular order of importance or relevancy of such aspects.

Clause 1: A Device Comprising:
a first switch leg comprising a first plurality of switches coupled at a first switching node, wherein the first switch leg is configured to be coupled to a power source;
a second switch leg comprising a second plurality of switches coupled at a second switching node, wherein the second switch leg is configured to be coupled to a power source;
a coupled inductor comprising:
a first winding; and
a second winding,
wherein the first winding is coupled between the first switching node and a third node, and wherein the second winding is coupled between the second switching node and the third node; and
a controller configured to:
control switching of the first plurality of switches of the first switch leg using a first PWM signal; and
control switching of the second plurality of switches of the second switch leg using a second PWM signal; and
set, based on a measurement of a voltage at the first switching node, a phase difference between the first PWM signal and the second PWM signal.

Clause 2: The device of clause 1, further comprising a voltage sensor configured to measure the voltage at the first switching node, and to provide the measurement of the voltage at the first switching node to the controller.

Clause 3: The device of any one of clauses 1-2, wherein, based on a closed control loop, the controller is configured to:
determine a switching node voltage rise event time based on the voltage at the first switching node;
determine a timing error based on a difference between:
a switching event time of at least one of the first plurality of switches in the first leg; and
the switching node voltage rise event time; and
determine, based on the timing error, the phase difference between the first PWM signal and the second PWM signal.

Clause 4: The device of clause 3, wherein the controller is configured to determine the switching node voltage rise event time based on a voltage level of the first switching node reaching a threshold voltage.

Clause 5: The device of any one of clauses 3 to 4, wherein the controller is configured to determine the timing error further based on subtracting a set-point from the difference between the switching event time of the one of the first plurality of switches, and the switching node voltage rise event time.

Clause 6: The device of clause 5, wherein the set-point is based on to an expected time duration for the voltage level at the first switching node to rise from the threshold voltage to a voltage level of a supply voltage.

Clause 7: The device of any one of clauses 3 to 6 wherein the controller is configured to determine a correspondence between:
the timing error; and
the phase difference between the first PWM signal and the second PWM signal.

Clause 8: The device of any one of clauses 3 to 6, wherein the correspondence comprises one of:
a Look Up Table; or
a computational model.

Clause 9: The device of any one of clauses 7 to 8, wherein the controller comprises a filter configured to filter the phase difference.

Clause 10: The device according to clause 9, wherein the controller further comprises a PWM generator configured to generate the first PWM signal and the second PWM based on the filtered phase difference.

Clause 11: The device of any one of clauses 1 to 10, further comprising a first current sensor configured to measure current through the first winding and a second current sensor configured to measure current through the second winding,
wherein the controller is configured to balance the currents through the first winding and the second winding by controlling the first switch leg and the second switch leg.

Clause 12: The device of any one of clauses 1 to 11, wherein the controller is further configured to control, based on a current through at least one of the first winding or the second winding, a frequency of the first PWM signal and a frequency of the second PWM signal.

Clause 13: The device of clause 12, wherein the controller is configured to increase, based on a reduction in the level of ripple current through at least one of the first winding or the second winding, a frequency of at least one of the first PWM signal or the second PWM signal.

Clause 14: The device any one of clauses 12-13, wherein controller is configured to decrease, based on an increase in a level of ripple current through at least one of the first winding or the second winding, the frequency of the first PWM signal and of the second PWM signal.

Clause 15: The device of any one of clauses 1 to 14, further comprising:
a third switch leg comprising a third plurality of switches coupled at a third switching node;
a fourth switch leg comprising a fourth plurality of switches coupled at a fourth switching node;
a second coupled inductor comprising:
a third winding; and
a fourth winding,
wherein the third winding is coupled between the fourth switching node and a sixth node, and wherein the fourth winding is coupled between the fifth switching node and the sixth node,
wherein the controller is configured to:
control a switch of the third plurality of switches of the third switch leg using the first PWM signal, and
control a switch of the fourth plurality of switches of the fourth switch leg using the second PWM signal.

Clause 16: The device of clause 15, further comprising a second voltage sensor configured to:
measure a voltage at the third switching node, and
provide a measurement of the voltage at the third switching node to the controller.

Clause 17: The device of any one of clauses 15 to 16, wherein the controller is configured to:
determine a switching node voltage rise event of one of the third switching node based on the measurement of the voltage at the third switching node;
determine a timing error based on a difference between:
a switching event of the one of the third plurality of switches; and
the switching node voltage rise event;
determine, based on the timing error, the phase difference between the first PWM signal and the second PWM signal.

Clause 18: The device of any one of clauses 15 to 16, further comprising a first current sensor configured to measure the current through the third winding and a second current sensor for measuring current through the fourth winding,
wherein the controller is configured to control the third switch leg and the fourth switch leg to balance the currents through the third winding and the fourth winding.

Clause 19: The device of any one of clauses 15 to 18, wherein the third node and the fifth node are coupled to a load.

Clause 20: The device of any one of clauses 1 to 19, wherein the device is one of a half-bridge converter, a full-bridge (H-Bridge) converter, a flying capacitor converter, a HERIC converter, a cascaded-H-bridge converter, a Neutral Point Clamped (NPC) converter, a A-NPC converter, or a T-type NPC converter.

Clause 21: The device of clauses 1-20 wherein the controller comprises a closed control loop comprising:
a switching node voltage rise event time detection control block configured to determined a switching node voltage rise event time associated with at least one switch of the first switch leg;
a switching event time detection control block configured to determine a switching event time associated with at least one of switch of the first switch leg;
a time difference block configured determined a time difference between the switching event time, the switching node voltage rise event time;
a time to phase control block configured to determined a phase difference $\Delta\theta_{pwm}$ between the first PWM signal and the second PWM signal based on the time difference between the switching event time of the switch and the switching node voltage rise event time; and
a PWM generator block configured to generate the first PWM signal and the second PWM signal based on the determined phase difference.

Clause 22: The device of clause 21, wherein the PWM generator block comprises a carrier generator and a PWM comparator,
wherein the carrier generator is configured to generate two phase shifted carriers based on a reference carrier and the determined phase difference, and
wherein the PWM comparator is configured to compare the two carriers to a reference signal to generate the first PWM signal and the second PWM signal.

Clause 23: The device of any one of clauses 21-22, wherein the a time to phase control block comprises a filter, wherein the filter comprise one of:
proportional filter;
an integral filter;
a derivative filter;
a proportional and an integral filter;
a proportion and derivative filter;
an integral and derivative filter;
a proportional, integral and derivative filter;
a low pass filter.

Clause 24: The device of any one of clauses 21-23 further comprising a currents balancing loop comprising:
a currents measuring control block configured to measure current through the first winding and current through the second winding;
a currents difference control block configured to determine a difference between the current through the first winding and the current through the second winding; and
a filter block configured to determine a PWM correction m for the first PWM signal and a PWM correction the second PWAM signal, based on the difference between the current through the first winding and the current through the second winding.

Clause 25: The device of clause 24, wherein the filter block is configured to receive the phase difference correction from the time to phase block,
wherein parameters of the filter block are determined based on the phase difference correction.

Clause 26: The device of any one of clauses 1-25, wherein the controller is configured to determine the phase difference between the first PWM signal and the second PWM signal that generates a ripple current in at least one of the first winding or the second winding that has a negative value that is not smaller than a current sufficient for zero-voltage switching (ZVS).

Clause 27: The device of any one of clauses 1-26, wherein the controller is configured to set the phase difference between the first PWM signal and the second PWM signal further based on a measurement of a voltage at the second switching node.

Clause 28: A method comprising:
measuring, using a sensor, a voltage at a first switching node of a first switch leg that is coupled to a first winding of a coupled inductor;
determining, based on the measured voltage, a phase difference between:
the first pulse width modulation (PWM) signal for the first switch leg coupled to a first winding of a coupled inductor; and
the second PWM signal for a second switch leg that is coupled to a second winding of the coupled inductor;
setting, based on the determined phase difference, a phase between the first PWM signal and the second PWM signal; and
switching, based on one of the first PWM signal or the second PWM signal, at least one switch in at least one of the first switch leg or the second switch leg.

Clause 29: the method of clause 28 wherein determining a phase difference comprises:
determining a timing error based on a time difference between:
the switching event time of a switch in the first switch leg;
and a switching node voltage rise event time of the first switching node;
determining, based on the timing error the phase difference between the first PWM signal and the second PWM.

Clause 30: The method of any one of clauses 29, wherein determining a timing error further comprises subtracting a set-point from a time difference between the switching event time and the switching node voltage rise event time.

Clause 31: The method of clause 30, wherein the set-point is determined based on an expected time duration for the voltage at the first switching node to rise from a threshold voltage to a supply voltage.

Clause 32: The method of any one of clauses 29-30, further comprising determining the switching node voltage rise event time based on the voltage level of the first switching node reaching a threshold voltage.

Clause 33: The method of any one of clauses 28-32 further comprising:
control the first switch leg using the first PWM signal; and
control the second switch leg based on the second PWM signal.

Clause 34: The method of any one of clauses 28-33, further comprising increasing a frequency of at least one of the first PWM signal or the second PWM signal based on a reduction in a level of ripple current through at least one of the first winding or the second winding.

Clause 35: The method any one of clauses 28-33, further comprising decreasing the frequency of at least one of the first PWM signal or the second PWM signal based on an increase in a level of ripple current through at least one of the first winding or the second winding.

Clause 36: The method of any one of clauses 28-35 further comprising:

measuring a current through the first winding and a current through the second winding;
determining a difference between the current through the first winding and the current through the second winding; and
determining a PWM correction for the first PWM signal and a PWM correction fo the second PWM signal, based on the difference between the current through the first winding and the current through the second winding.

Clause 37: The method of any one of clauses 28-36, wherein setting the phase comprises setting the phase such that a ripple current in at least one of the first winding or the second winding has a negative value that is not smaller than a current sufficient for zero voltage switching (ZVS).

Clause 38: The method of any one of clauses 28-37, further comprising generating, by the controller, a first PWM signal and the second PWM signal.

One or more aspects described herein may be embodied in computer-usable data and computer-executable instructions, such as in one or more program modules, executed by one or more computers or other devices (e.g., by controller 202 that may comprise one or more processors and that may comprise or be coupled to a computer-readable medium storing the computer-executable instructions). Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, other memory, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGAs), and the like. Particular data structures may be used to more effectively implement one or more aspects described herein, and such data structures are contemplated within the scope of computer executable instructions and computer-usable data described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:
1. A device comprising:
a first switch leg comprising a first plurality of switches coupled at a first switching node, wherein the first switch leg is configured to be coupled to a power source;
a second switch leg comprising a second plurality of switches coupled at a second switching node, wherein the second switch leg is configured to be coupled to a power source;
a coupled inductor comprising:
a first winding; and
a second winding, wherein the first winding is coupled between the first switching node and a third node, and wherein the second winding is coupled between the second switching node and the third node; and a controller configured to:
control switching of the first plurality of switches of the first switch leg using a first pulse width modulation (PWM) signal;
control switching of the second plurality of switches of the second switch leg using a second PWM signal; and
set, based on a measurement of a voltage at the first switching node, a phase difference between the first PWM signal and the second PWM signal; and
based on a closed control loop:
determine a switching node voltage rise event time based on the voltage at the first switching node;
determine a timing error based on a difference between:
a switching event time of at least one of the first plurality of switches in the first switch leg; and
the switching node voltage rise event time; and
determine, based on the timing error, the phase difference between the first PWM signal and the second PWM signal.

2. The device of claim 1, further comprising a voltage sensor configured to measure the voltage at the first switching node, and to provide the measurement of the voltage at the first switching node to the controller.

3. The device of claim 1, wherein the controller is configured to determine the switching node voltage rise event time based on a voltage level of the first switching node reaching a threshold voltage.

4. The device of claim 1, wherein the controller is configured determine the timing error further based on subtracting a set point from the difference between the switching event time of the one of the first plurality of switches and the switching node voltage rise event time.

5. The device of claim 4, wherein the set point is based on an expected time duration for the voltage at the first switching node to rise from a threshold voltage to a voltage level of a supply voltage.

6. The device of claim 1, wherein the controller is configured to determine a correspondence between:
the timing error, and
the phase difference between the first PWM signal and the second PWM signal.

7. The device of claim 1, further comprising a first current sensor configured to measure current through the first winding and a second current sensor configured to measure current through the second winding,
wherein the controller is configured to balance the currents through the first winding and the second winding by controlling the first switch leg and the second switch leg.

8. The device of claim 1, wherein the controller is further configured to control, based on a current through at least one of the first winding or the second winding, a frequency of the first PWM signal and a frequency of the second PWM signal.

9. The device of claim 1, wherein the controller is configured to increase, based on a reduction in a level of ripple current through at least one of the first winding or the second winding, a frequency of at least one of the first PWM signal or the second PWM signal, and
wherein the controller is configured to decrease, based on an increase in a level of ripple current through at least one of the first winding or the second winding, the frequency of at least one of the first PWM signal or the second PWM signal.

10. The device of claim 1, wherein the controller is configured to determine the phase difference between the first PWM signal and the second PWM signal that generates a ripple current in at least one of the first winding or the second winding that has a negative value that is not smaller than a current sufficient for zero-voltage switching (ZVS).

11. The device of claim 1, wherein the device comprises a direct-current (DC) to DC converter.

12. The device of claim 1, wherein the device comprises a direct-current (DC) to alternating-current (AC) inverter.

13. A method comprising:
measuring, using a sensor, a voltage at a first switching node of a first switch leg that is coupled to a first winding of a coupled inductor;
determining, based on the measured voltage, a timing error based on a time difference between:
a switching event time of a switch in the first switch leg; and
a switching node voltage rise event time of the first switching node;
determining, based on the timing error, a phase difference between:
a first pulse width modulation (PWM) signal for the first switch leg; and
a second PWM signal for a second switch leg that is coupled to a second winding of the coupled inductor;
setting, based on the determined phase difference, a phase between the first PWM signal and the second PWM signal; and
switching, based on one of the first PWM signal or the second PWM signal, at least one switch in at least one of the first switch leg or the second switch leg.

14. The method of claim 13, wherein determining the timing error is further based on subtracting a set point from a time difference between the switching event time and the switching node voltage rise event time.

15. The method of claim 14, wherein the set point is determined based on an expected time duration for the voltage at the first switching node to rise from a threshold voltage to a supply voltage.

16. The method of claim 13, further comprising determining the switching node voltage rise event time based on a voltage level of the first switching node reaching a threshold voltage.

17. The method of claim 13, wherein a direct-current (DC) to DC converter comprises the first switch leg and the second switch leg.

18. The method of claim 13, wherein a direct-current (DC) to alternating-current (AC) inverter comprises the first switch leg and the second switch leg.

* * * * *